United States Patent [19]

Lopez

[11] Patent Number: 5,596,655
[45] Date of Patent: Jan. 21, 1997

[54] METHOD FOR FINDING AND CLASSIFYING SCANNED INFORMATION

[75] Inventor: Patricia D. Lopez, Ft. Collins, Colo.

[73] Assignee: Hewlett-Packard Company, Palo Alto, Calif.

[21] Appl. No.: 472,359

[22] Filed: Jun. 7, 1995

Related U.S. Application Data

[63] Continuation of Ser. No. 931,637, Aug. 18, 1992, abandoned.

[51] Int. Cl.⁶ .................................................. G06K 9/46
[52] U.S. Cl. ........................ 382/173; 382/199; 382/286
[58] Field of Search .......................... 382/171, 173–176, 382/289–290, 199, 296, 282, 162, 165, 291, 292; 358/462, 464

[56] References Cited

U.S. PATENT DOCUMENTS

| | | | |
|---|---|---|---|
| 4,503,556 | 3/1985 | Scherl et al. | 382/9 |
| 4,833,722 | 5/1989 | Morton et al. | 382/22 |
| 5,050,222 | 9/1991 | Lee | 358/462 |
| 5,091,964 | 2/1992 | Shimomura | 382/9 |
| 5,123,062 | 6/1992 | Sango | 382/9 |
| 5,134,666 | 7/1992 | Imao et al. | 358/462 |
| 5,216,724 | 6/1993 | Suzuki et al. | 382/289 |
| 5,280,367 | 1/1994 | Zuniga | 382/9 |
| 5,331,442 | 7/1994 | Sorimachi | 382/18 |

OTHER PUBLICATIONS

Ofoto User's Manual, no publication date known.
Ofoto Demonstration Diskette, published May 16, 1992.

*Primary Examiner*—Andrew Johns

[57] ABSTRACT

A system that scans an image into a computer system and then locates left and right edges of information within each row of the image. The system defines top and bottom rows of information as first and last rows of a number of consecutive rows of the image that have a number of pixels between the left and right edges. The system linearizes the edge data, places a left boundary at the leftmost point of the linearized left edge, and places a right boundary at the rightmost point of the linearized right edge. Each pixel within the boundaries is analyzed to classify the pixel as white, light gray, dark gray, black, colored, or as having some color; a percentage of pixels in each class is created; and the image classification is determined using these percentages. The system displays the image and image classification, with the boundary superimposed over the image.

19 Claims, 17 Drawing Sheets

METHOD FOR FINDING AND CLASSIFYING SCANNED INFORMATION

CROSS REFERENCE TO RELATED APPLICATIONS

This is a continuation of copending application Ser. No. 07/931,637 filed on Aug. 18, 1992, now abandoned.

FIELD OF THE INVENTION

This invention relates to computer systems and more particularly to document scanning within such computer systems. Even more particularly, the invention relates to finding and classifying information within a scanned image.

BACKGROUND OF THE INVENTION

Optical character recognition, or OCR, is the process of transforming a graphical bit image of a page of textual information into a text file wherein the text information is stored in a common computer processable format, such as ASCII. The text file can then be edited using standard word processing software.

When a document is being scanned, the brightness of each dot, or pixel, within the image of the document is stored as a code that represents the tonal range of the pixel. When using a monochromatic scanner, the tonal range varies from pure black to pure white along a gray scale. The code, or gray scale level, is typically eight bits, giving a tonal range of 0 to 255, where 0 is typically pure black and 255 is typically pure white. If a color image is being scanned, three values are returned, one for red, one for green, and one for blue. Each of these has a range of 0 to 255.

After a document is scanned, the information content must be separated from the background before the information can be processed. One of the first steps in separating the information from the background is to determine the edges of the information, so that the information can be more easily classified by type. The next step is to determine the type of the information within the edges.

There is a need in the art then for a system to locate the information in a scanned document. There is a further need for such a system the classifies the type of information present. The present invention meets these needs.

SUMMARY OF THE INVENTION

It is an aspect of the invention to locate information within a scanned document image.

It is another aspect of the invention to find the edges of the information.

Another aspect of the invention is to determine a bounding rectangle that surrounds the information within the image.

A further aspect is to define the type of information contained within the bounding rectangle.

The above and other aspects of the invention are accomplished in a system that scans an image of a page into a computer system and then locates left and right edges of information within each row of the image. The left edge is located by first averaging the absolute difference between each pixel and the previous pixel with the absolute difference between each pixel and the subsequent pixel and then comparing the averaged difference to an edge threshold. For color image data, this involves computing absolute differences between each of red, green, and blue; the average of the differences is computed using a pseudo-NTSC weighting of 5 for the red differences, 8 for the green differences, and 3 for the blue differences, then dividing by 16. For grayscale image data, the averaged difference is computed using the two previous pixels and the two subsequent pixels in the manner described above to smooth noisy data. If the averaged difference between the pixels exceeds an edge threshold, the location of the previous pixel is set as the left edge for the row. The same process is then performed for the right edge, and setting the location of the subsequent pixel as the edge.

After locating the edges, the system defines a top row of the information as a first row of the image that has a predetermined number of pixels between left and right edges and defines the bottom row of information as the last row that has a predetermined number of pixels between left and right edges.

After setting the top and bottom rows of information, the system processes the left and right edges to linearize the edge data. This is done by first finding a mean and standard deviation of the differences between each pair of edges, for both the left and right edge set, and then finding the median of the edge points in both the left and right edge sets. The location within a row of each edge is then compared to the location of the edge of the previous row and the subsequent row, and if the difference between either location exceeds the mean plus half the standard deviation, and the difference between the edge location and the median exceeds the mean plus half the standard deviation, the edge location is recomputed as the average between the previous row edge and the subsequent row edge.

The system then locates a leftmost point within the linearized left edge data and places a left boundary at this leftmost point, and locates a rightmost point within the linearized right edge data and places a right boundary at this rightmost point.

After finding the four bounds of the information, the system analyzes each pixel within the bounding rectangle to classify the pixel as white, light gray, dark gray., black, colored, or as having some color. The system then creates a percentage of pixels in each class and determines the type of document using these percentages.

After determining the bounding rectangle and the type of image, the system displays the image with the bounding rectangle superimposed over the image. The system also displays the type of the image within the bounding rectangle.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
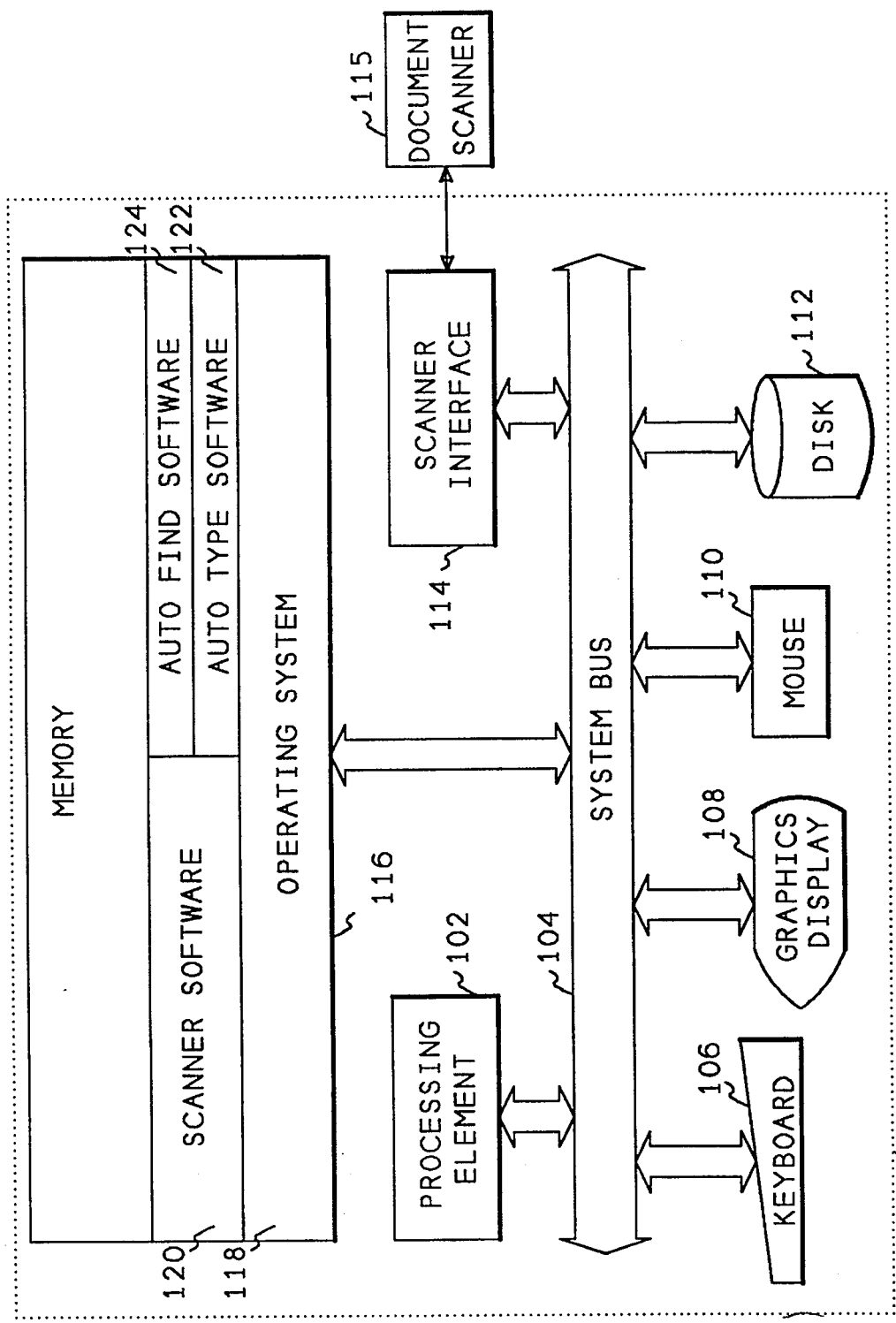
FIG. 1 shows a block diagram of a computer system incorporating the invention.

FIG. 1 shows a block diagram of the hardware and software of the invention. Referring now to FIG. 1, a computer system 100 contains a processing element 102 which communicates to other elements of the computer system 100 over a system bus 104. A keyboard 106 allows user of the system 100 to input commands and data into the computer system 100. A mouse 110, allows the user to input graphical information into the computer system 100. A display 108 allows the computer system 100 to output information to the user of the system. A disk 112 stores the software of the present invention as well as all the data collected by the present invention. A scanner interface 114 connects to a document scanner 115 to allow the present invention to receive information from the scanner 115.

The document scanner 115 may be either a gray scale scanner or a color scanner. A gray scale scanner returns a gray scale value for each pixel scanned. This value is typically eight bits having a range of 0 to 255, with 0 typically being pure black and 255 typically being pure white. Color scanners return three values, red, green and blue, for each pixel, and each value has a range of 0 to 255.

A memory 116 contains an operating system 118 which is used by the present invention to access the keyboard, graphics display 108, mouse 110, disk 112, as well as other elements of the computer system 100. The auto find software 124 and auto type software 122, of the present invention, is part of the scanner software 120 which performs other functions for the user of the system.

Figure 2:
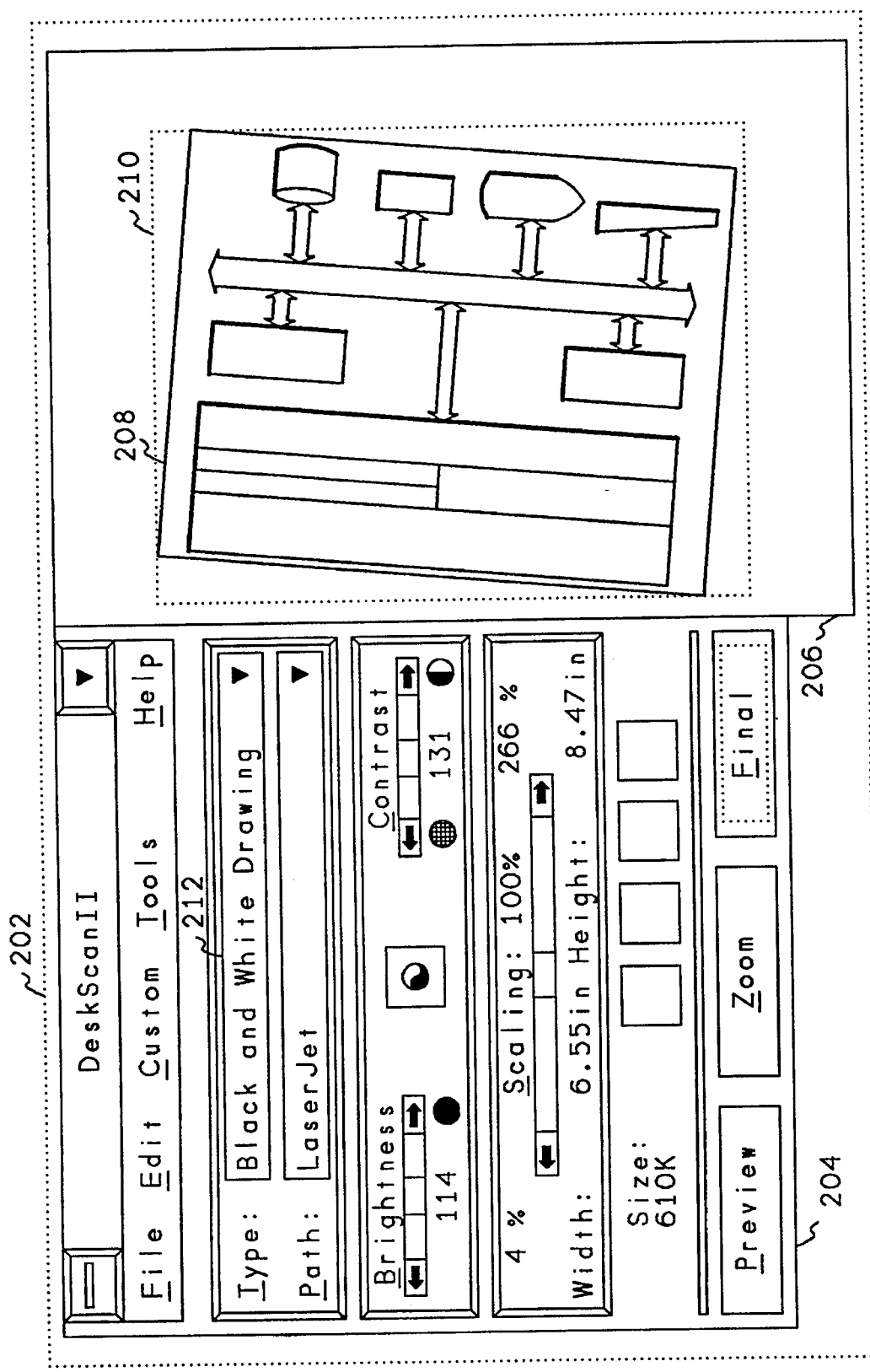
FIG. 2 shows an example screen display output from the invention.

FIG. 2 shows an example screen output from the invention. Referring now to FIG. 2, a screen display 202 is shown having an information section 204 and an image section 206. Within the information section 204, a type field 212 indicates that the image is a black and white drawing.

Within the image section 206, the image 208 is displayed. Around the image 208, the system displays a bounding rectangle 210. The description below will define how the bounding rectangle 210 is created, and how the type field 212 is determined.

The other information within the information section 204 is created by the scanner software 120, and is not part of the invention.

Figure 3:
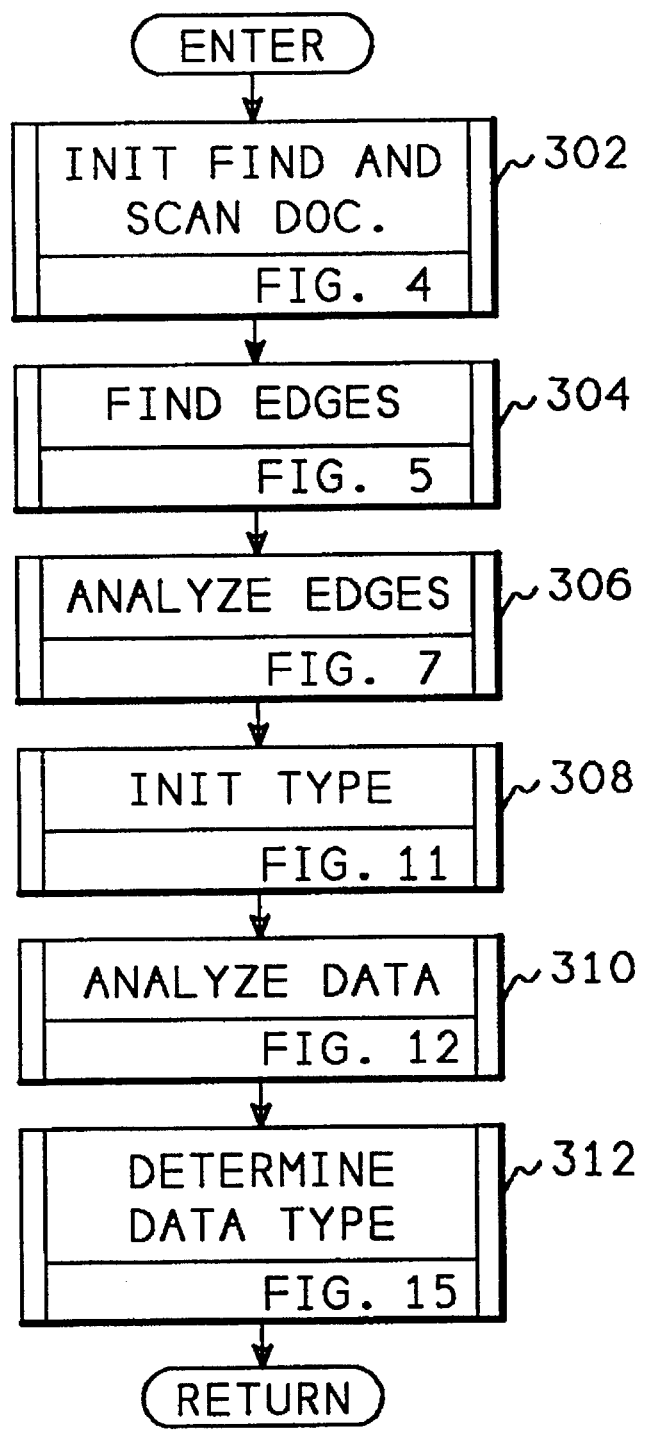
FIG. 3 shows a flowchart of the overall flow of the software of the invention.

FIG. 3 shows a flow chart of the overall flow of the software of the invention. This software is called from the scanner software 120 (FIG. 1), when requested by the user of the scanner software 120. The scanner software 120 performs other scanner functions which are not part of the invention.

Figure 4:
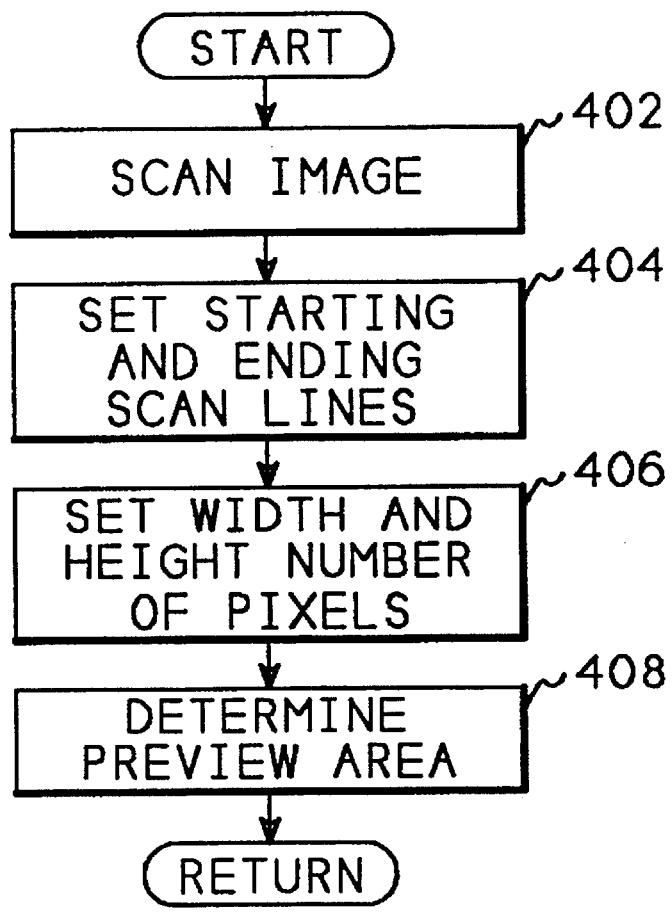
FIG. 4 shows a flowchart for scanning the image and initialization for finding the information.

Referring now to FIG. 3, after entry, block 302 calls FIG. 4 which activates the document scanner 115 and then initializes the software for the rest of the scanning operation. Block 304 then calls FIG. 5 to find the edges of the information within the image that was returned from the document scanner 115 (FIG. 1). After finding the edges, block 306 calls FIG. 7 to analyze the edges and place a bounding rectangle around the document edges. Block 308 then calls FIG. 11 to initialize for determining the classification, or type, of information that has been scanned. Block 310 then calls FIG. 12 to analyze the scanned information and block 312 calls FIG. 15 to determine the classification of information that was scanned. After determining the classification of the information, FIG. 3 returns to the scanner software 120 (FIG. 1).

FIG. 4 shows a flowchart for scanning the image and initializing the software for finding the information within the scanned image. Referring now to FIG. 4, after entry, block 402 activates the document scanner 115 (FIG. 1) through the scanner interface 114 (FIG. 1), to scan the document image and transfer it into the memory 116. Block 404 readjusts the edges of the scanned image by discarding a fixed number of the first and last rows and columns of the image, since the accuracy of data from the document scanner 115 at these locations on the scanner bed varies from scanner to scanner. Block 406 sets up the width and height of the scanned preview image based on the size of the preview area 206, which is defined by the user of the system, and block 408 initializes the left and right edge buffer arrays for the length of the preview area. FIG. 4 then returns to FIG. 3.

Figure 5:
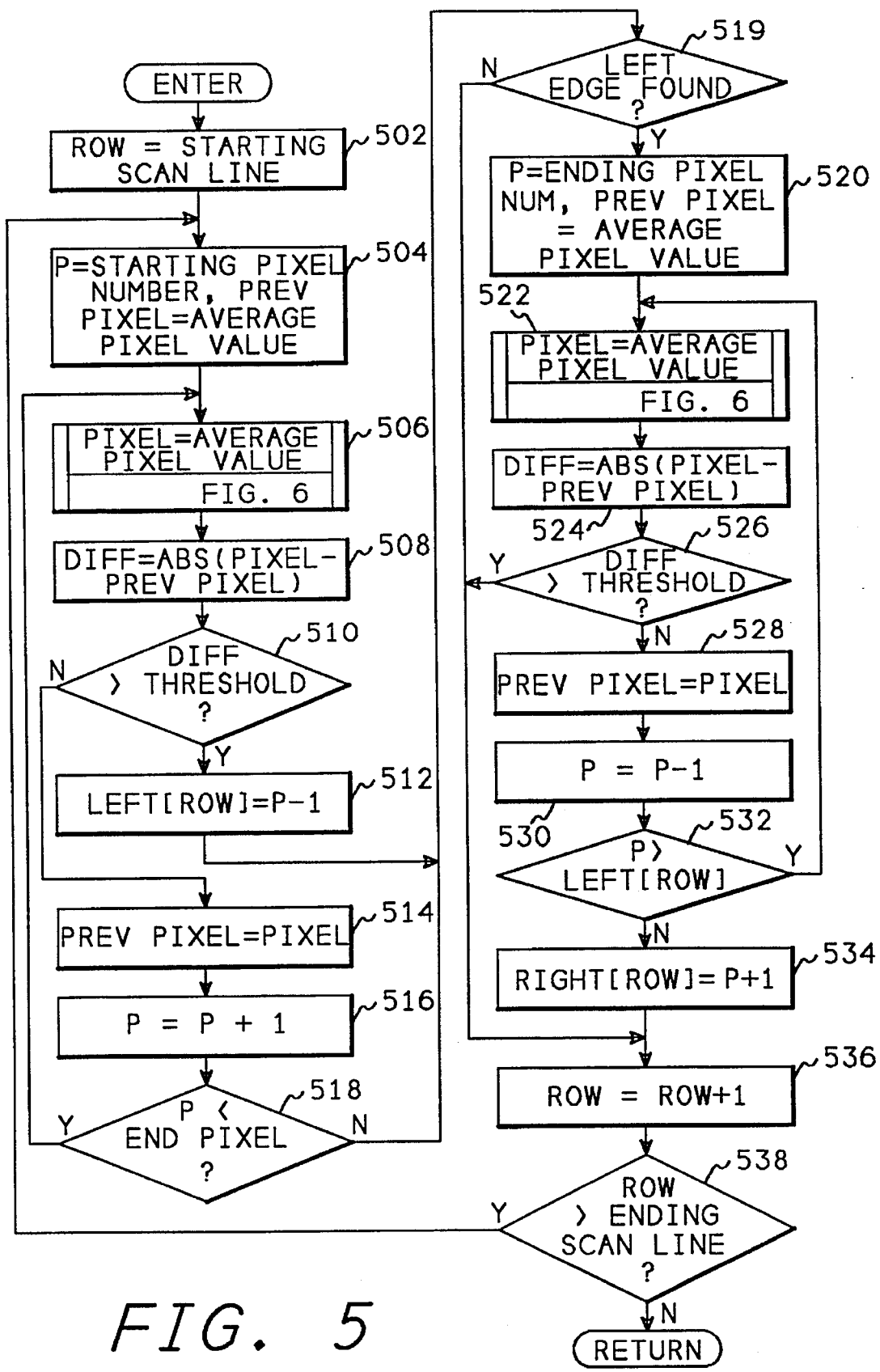
FIGS. 5 and 6 show a flowchart for finding the edges of the information within the scanned image.
Figure 6:
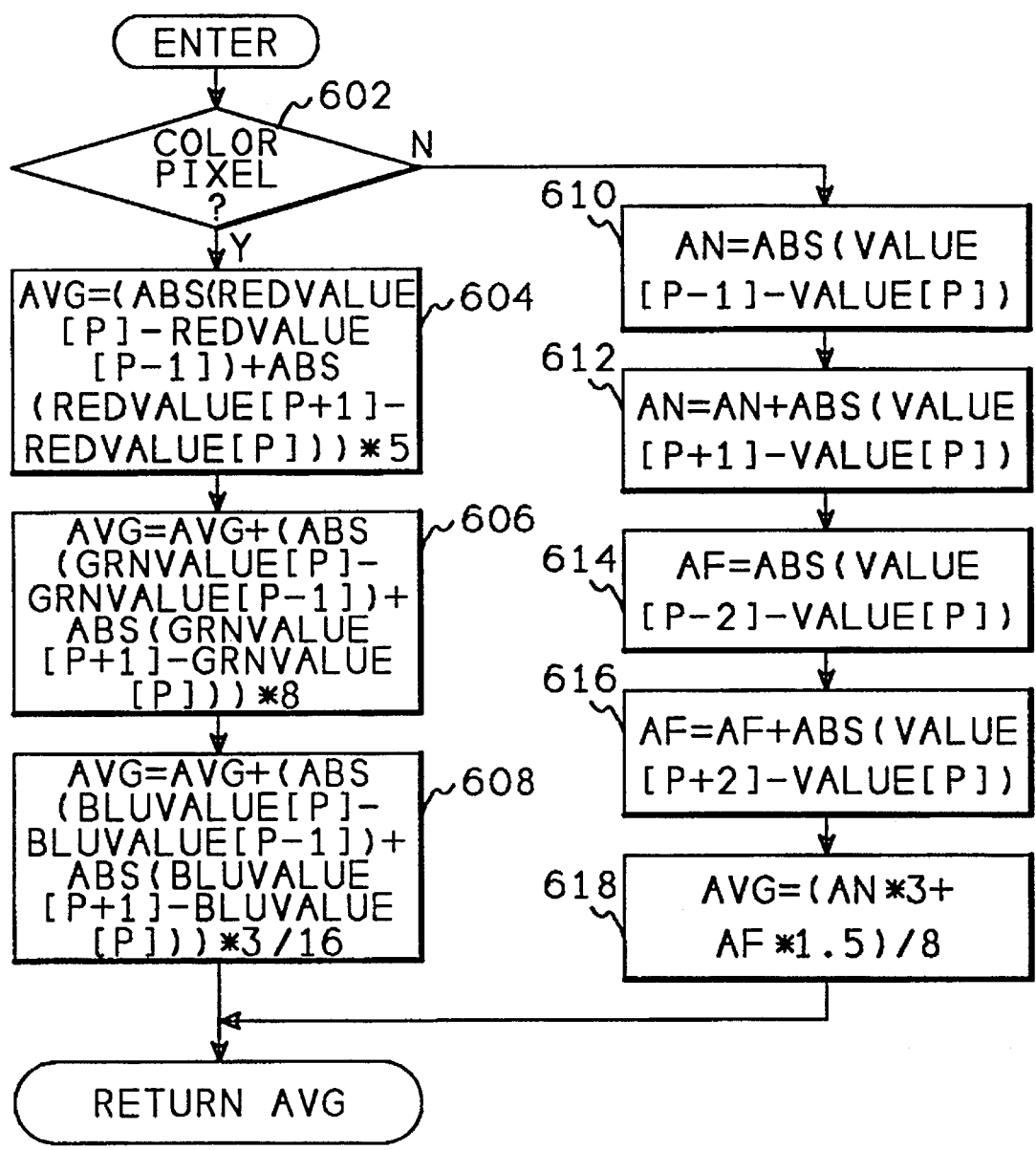

FIGS. 5 and 6 show a flowchart for finding the edges of the information within the scanned image. FIG. 5 is called from block 304 of FIG. 3. After entry, block 502 initializes a variable ROW to the starting scan line within the document image scanned in FIG. 4. Block 504 then sets a variable P to the starting pixel location within the line, that is, P is an index into the scanned line, or analogously, P is a column index. Block 504 also sets a variable PREV PIXEL to the averaged scanned image value for the pixel to the left of the starting pixel, that is, the pixel at location P–1. The starting pixel in a row is always set to the second pixel from the readjusted left edge for a color scanner and the third pixel from the readjusted left edge for a gray scale scanner to provide for a previous pixel in the row for color analysis and two previous pixels for gray analysis. Similarly, the last pixel processed in a row leaves room at the end of the row.

Block 506 calls FIG. 6 to determine the average scanned value for the pixel at P, and places this value into a variable called PIXEL. Block 508 then computes the value of the variable DIFF as the absolute value of the difference between PIXEL and PREV PIXEL. In other words, DIFF is the difference between the scanned image values, after being difference averaged, between the current pixel and the previous pixel(s).

Block 510 then determines whether this difference is greater than an Edge Threshold value which is shown in Table 1. The Edge Threshold is set to determine how high a contrast must exist in order for the system to detect an edge of the information within the scanned image. If the difference is less than or equal to the Edge Threshold, block 510 transfers to block 514 which sets the current pixel value into the previous pixel value and then block 516 increments the current pixel pointer P by one to point to the next pixel within the row. Block 518 then determines whether there are additional pixels within the row and if there are, block 518 transfers back to block 506 to process the next pixel. If there are no more pixels to be processed within the row, block 518 transfers to block 519 to determine whether a left edge was found. If no left edge was found, no right edge will be found, so block 519 transfers to block 534. if a left edge was found, block 519 transfers to block 520 to process the right edge data.

If the difference between the current pixel and the previous pixel is greater than the Edge Threshold value, block 510 transfers to block 512 which sets the edge location in the left edge array, for the ROW being examined, to P–1. Block 512 then transfers to block 520 to process the right edge for this row.

Block 520 sets the current pixel number, that is the variable P, to the ending pixel number for the row and also sets the value of PREV PIXEL to the average scanned image value of the ending pixel plus one. Block 522 then calls FIG. 6 to set the value for the variable PIXEL to the average value for the pixel indexed by P. Block 524 then computes DIFF as the absolute value of the difference between PIXEL and PREV PIXEL and block 526 determines whether DIFF is greater than the Edge Threshold value shown in Table 1. If DIFF is less than or equal to the Edge Threshold value, block 526 transfers to block 528 which sets PREV PIXEL to PIXEL and then block 530 decrements the value of P to point to the next leftmost pixel. Block 532 determines whether P is greater than the last left edge pixel number found by block 512 and if it is, block 532 transfers back to block 522 to process the next pixel. If the difference DIFF is greater than the Edge Threshold control goes to block 534 which sets the value in the RIGHT array for this row to P+1 to indicate the rightmost edge for this row within the document. Block 536 then increments the value of row and block 538 determines whether all the rows within the document have been scanned. If more rows remain to be scanned, block 538 transfers back to block 504 to scan the next row. If all rows have been scanned, block 538 then returns to FIG. 3.

FIG. 6 shows a flowchart for computing the average value for a pixel and is called from blocks 504, 506, 520 and 522 of FIG. 5. Referring now to FIG. 6, after entry, block 602 determines whether the pixel being processed is a color pixel or a monochrome pixel. If the pixel being processed is a gray scale pixel, block 602 transfers to block 610 which computes the value for variable AN as the absolute value of the difference between the value of the current pixel and the value of the previous pixel. Block 612 then adds to the variable AN the absolute value of the difference between the value of the subsequent pixel and the value of the current pixel. That is, blocks 610 and 612 compute the sum of the differences in value between the current pixel and the pixel on either side of it. Block 614 computes the value of a variable AF as the absolute value of the difference between the current pixel–2 and the value of the current pixel and block 616 adds to this the absolute value of the difference between the current pixel+2 and the value of the current pixel. That is, blocks 614 and 616 compute the variable AF as the sum of the differences between the current pixel, the pixel 2 columns away on the left side of the current row, and the pixel 2 columns away on the right side of the current row. Block 618 then weights the pixels on either side of the current pixel more heavily than the pixels two columns away by computing an average as the variable AN multiplied by 3 plus the variable AF multiplied by 1.5 and then dividing the sum by 8. This average is then returned to FIG. 5.

If the pixel being processed is a color pixel, block 602 transfers to block 604 which computes a first value for AVG as the absolute value of the difference between the red component of the current pixel and the red component of the previous pixel, plus the absolute value of the difference between the red component of the subsequent pixel and the red component of the current pixel and then multiplies the sum by five. Block 606 performs the same operation with a green component of the pixel but multiplies the result by eight before adding it to the average. Block 608 then performs the same function for the blue component of the pixel but multiplies the result by three before adding it to the average, and then divides the average by 16. That is, the average computed by the blocks 604, 606, 608 and 609 provides a weighted average of the red, green, and blue components of the scanned data. After computing this average, block 609 returns the average to FIG. 5.

After FIGS. 5 and 6 have processed the image, the arrays LEFT and RIGHT will contain the column indices of the left and right edges respectively for each row within the scanned image, e.g., LEFT[10]=25 means that for row 10 of the scanned image data, the 25th pixel from the left edge of the data is an edge point. Similarly, if RIGHT[10]=40, the 40th pixel from the left edge of the data is an edge point; this would also indicate that the number of information pixels found between left and right edges in row 10 is 16. These edges have been determined by averaging the scanned value for each pixel with its neighbors, and then comparing that average value to the average value of the previous pixel within the row, and finding an edge when these two average values differ by the amount of the Edge Threshold.

Figure 7:
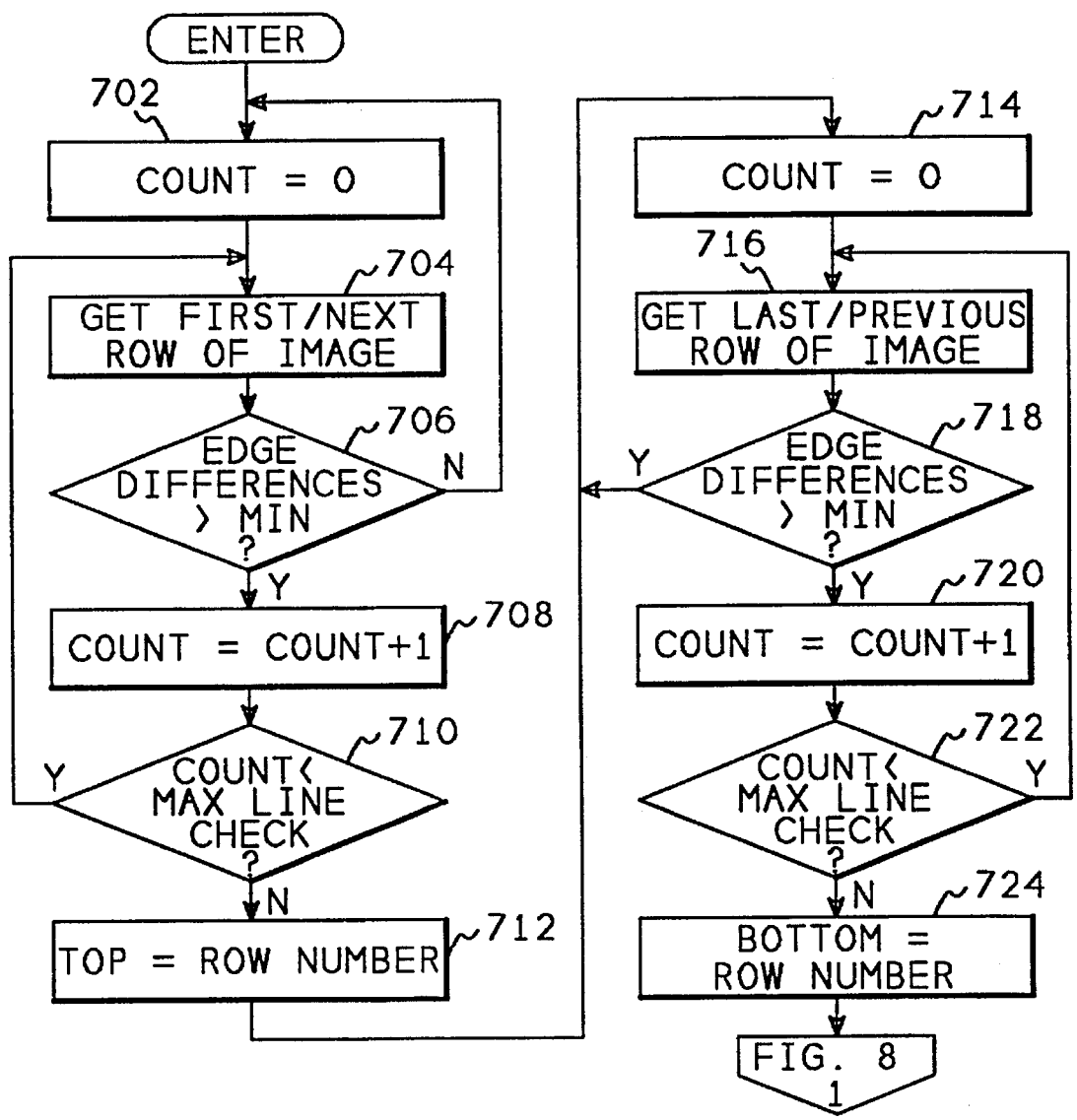
FIGS. 7–10 show a flowchart for analyzing the edges and placing a rectangle around the information.

FIGS. 7–10 show a flowchart for analyzing the edges and placing a bounding rectangle around the information within the scanned document. FIG. 7 shows a flowchart of determining the top and bottom rows of information within the image. Referring now to FIG. 7, after entry, block 702 initializes the count of consecutive valid lines COUNT to zero. Block 704 points to the first or next row within the image. Block 706 then determines whether the difference between the column indices denoted by the left and right edge data for this row are greater than the minimum line size as defined in Table 1. That is, block 706 determines whether the line is long enough, between its two defined edges, to be considered a valid line. If the line is too short, block 706 transfers back to block 702 to reset COUNT to zero, and then continues on to block 704 to examine the next row of the image to determine whether it is a valid top row. If the current row is considered long enough, block 706 transfers to block 708, which increments COUNT and then transfers to block 710 which checks to make sure that max line check consecutive rows, as defined in Table 1, have valid line data. If there are too few consecutive rows, block 710 transfers back to block 704. If there are enough rows, block 710 transfers to block 712 which sets TOP equal to the row number of the first row having edge differences greater than the minimum line size.

Block 714 then reinitializes COUNT to zero. Block 716 then gets the last or previous row of the image and block 718 determines whether the edge differences for this row are greater than the minimum line size of Table 1. If they are not, block 718 transfers back to block 714 to reset the COUNT, then block 716 gets the previous row for processing. When a row is found having edge differences greater than the minimum line size, block 718 transfers to block 720 which increments COUNT. Block 722 then checks to make sure that max line check consecutive rows, as defined in Table 1, have valid line data. If there are too few consecutive rows, block 722 transfers back to block 716. If there are enough rows, block 722 transfers to block 724 which sets BOTTOM equal to the last row number having edge differences greater than the minimum line size. Control then transfers to FIG. 8, block 802.

Figure 8:
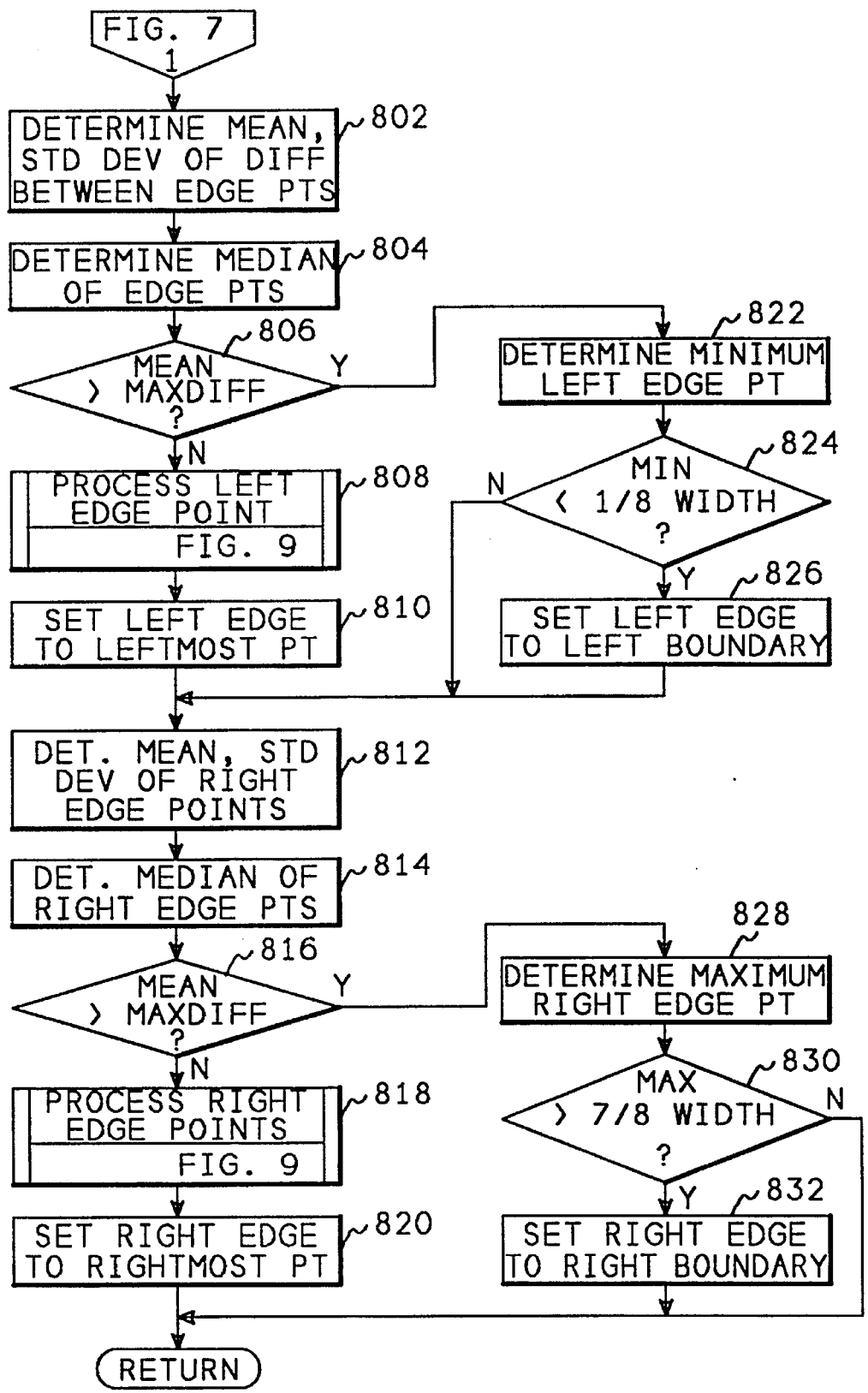

FIG. 8 shows a flowchart for processing the left and right edge point arrays to determine whether the information within the scanned image contains a definable left and right edge. Referring now to FIG. 8, after entry, block 802 determines the mean and standard deviation of the differences between each pair of edge point locations within the left edge point array. That is, a difference is computed between the first and second points, a second difference is computed between the second and third points, a third difference between the third and fourth points, etc. Block 802 determines the mean of all these differences as well as the standard deviation of these differences. Block 804 determines the median of the pixel locations, that is, column indices, contained within the left edge point array. Block 806 then determines whether the mean of the differences is greater than the Max Diff parameter in Table 1. That is, block 806 determines the linearity of the left edge of the information in the document. If the left edge is linear, the mean will be less than Max Diff, however, if the left edge is not very linear, the mean will be greater than Max Diff.

If the mean is greater than Max Diff, indicating that the edge is not linear, block 806 transfers to block 822 which finds the minimum left edge point within the array. Block 824 then determines if this minimum is within ⅛ of the preview area 206 and if the edge is within ⅛ of the width, block 824 transfers to block 826 which sets the left edge to the left boundary of the preview area 206, which corresponds to the left edge of the scanner copyboard as seen by the scanning elements within the document scanner 115. Thus, the method makes the assumption that if the left edge is not linear and the leftmost point is close to the left edge, then the document has no defined left bound and may overlap the edge of the scanner area. If the minimum left edge point is greater than ⅛ of the width, or after setting the left edge to the left boundary, control goes to block 812 to process the right edge points.

Figure 9:
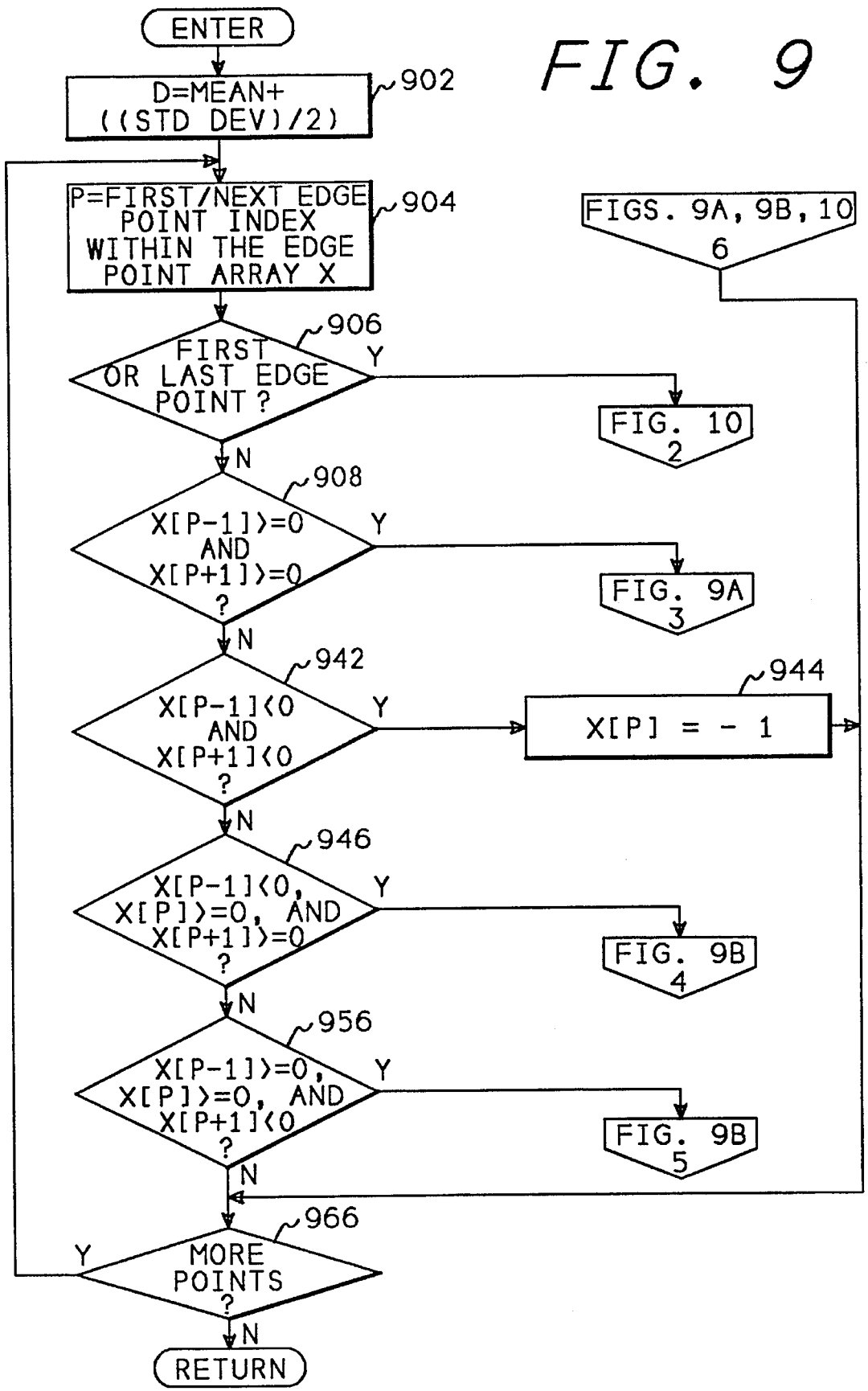
Figure 9A:
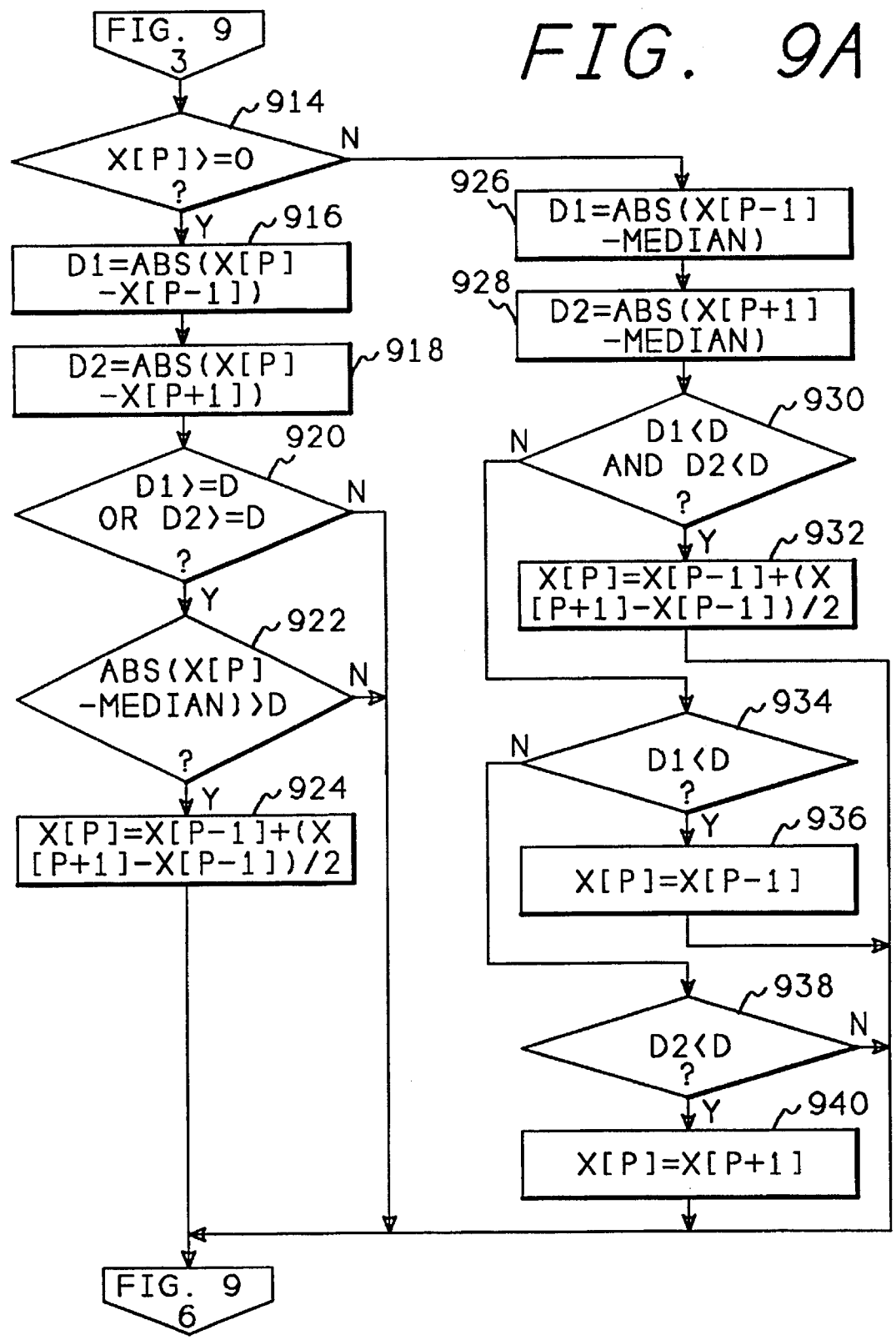
Figure 9B:
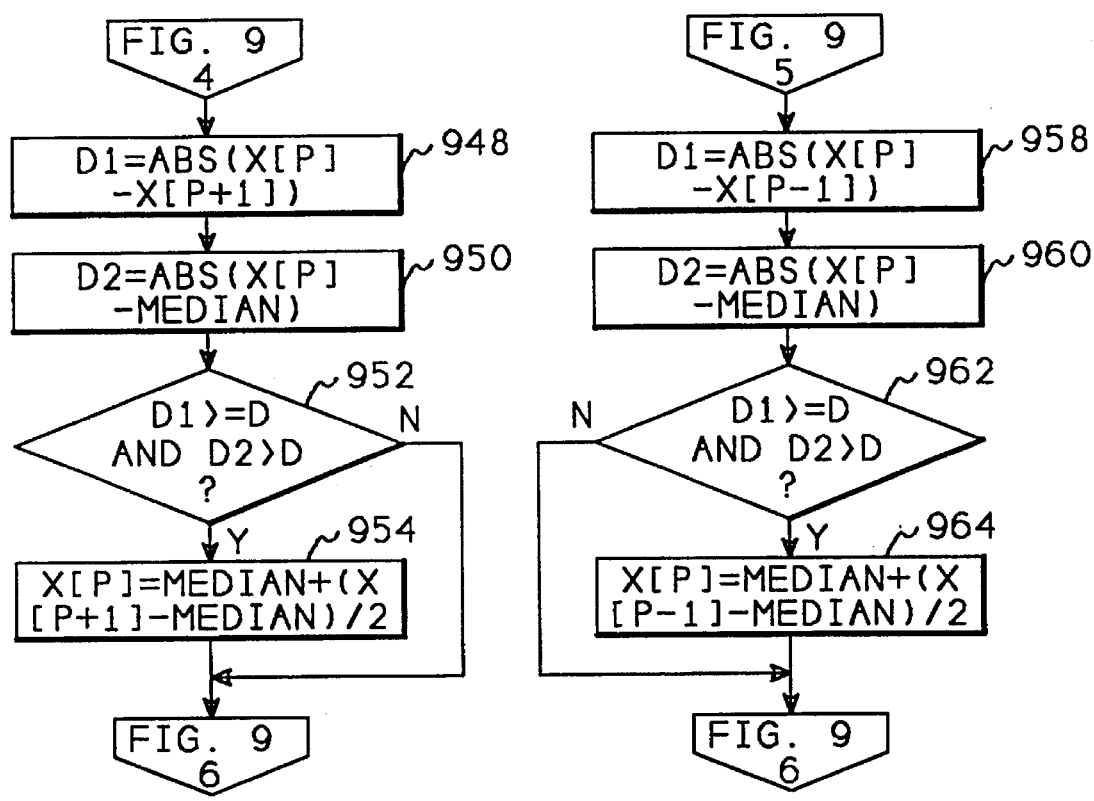

If the mean is not greater than Max Diff, indicating that the left edge is somewhat linear, block 806 transfers to block 808 which calls FIG. 9 to linearize the left edge point array. After returning from FIG. 9, block 810 sets the left edge point for the bounding rectangle to the leftmost point now contained in the left edge array.

The system now processes the right edge array. Block 812 determines the mean and standard deviation of the differences between the edge point locations in the right edge point array. Block 814 then determines the median of the right edge points, and block 816 determines whether the mean is greater than Max Diff, in order to determine whether the right edge of the information is linear. If the mean is greater than Max Diff, block 816 transfers to block 828 which determines the maximum right edge point within the array, and then block 830 determines whether the maximum right edge point is greater than ⅞ the width of the preview area 206. If the maximum right edge point is greater than ⅞ of the width, block 830 transfers to block 832 which sets the right edge to the right boundary of the preview area 206, which corresponds to the right edge of the scanner copyboard as seen by the scanning elements within the document scanner 115. After setting the right edge to the right boundary, or if the maximum point is not greater than ⅞ of the width, control returns to FIG. 3.

If the mean is less than or equal to Max Diff, block 816 transfers to block 818 which calls FIG. 9 to linearize the right edge point array and then block 820 sets the right edge to the right most point within the right edge array before returning to FIG. 3.

FIGS. 9, 9A, 9B and 10 attempt to linearize the edge data by computing an allowable difference range D based upon the mean and standard deviation of the differences between the points. Three differences are then computed for each point located within the middle of the array, that is, each point except the two end points. The three differences are between the point and the previous point, the point and the subsequent point, and the point and the median of all the points. If the difference between the current point and the previous point, or the difference between the current point and the subsequent point exceeds the difference range D, and the difference between the current point and the median also exceeds the difference range D, the value for the current point is recomputed as the average between the previous point and the subsequent point. In this manner, the effects of noise, dirt, or smudges on the glass of the scanner copyboard are limited.

If there is only one point in the array, that point is removed since there are to few points to consider.

The first and last points are special cases. If the first point is valid but the second point is not, the first point is made invalid. If the first and second points are valid, then the difference between the first and second point, and the difference between the first point and the median are computed. If the differences are greater than the difference range D, the first point is changed to be identical to the second point. Similarly, if the last point is valid but the second to last point is not, the last point is made invalid. If both the last and second to last points are valid, then the difference between these points is computed, as well as the difference between the last point and the median. If the differences are greater than the difference range D, the last point is changed to be identical to the second to last point. Further processing starts at the second point and continues until the second to last point, ensuring that a previous and subsequent point always exist.

In FIGS. 9, 9A, 9B and 10, the array X is either the left or right edge array, depending upon whether FIG. 9 has been called from block 808 or block 818 of FIG. 8. Referring now to FIGS. 9, 9A, 9B and 10, after entry, block 902 computes a value of the difference range D as the mean plus one-half the standard deviation. Block 904 then determines the value of a variable P which is set to the index of the first or next edge point within the array. Block 906 determines whether this point is the first point in the array or the last point in the array and if it is either, block 906 transfers to block 1002 in FIG. 10. If this point is within the middle of the array, block 906 transfers to block 908. Block 908 determines whether the previous point at index P−1 and the subsequent point at index P+1 are valid points. If they are, block 908 transfers to block 914 in FIG. 9A to verify the linearity of the point at index P.

In block 914, if the current point at index P is also a valid point, differences D1 and D2 are computed. D1 is the absolute value of the difference between the previous point at index P−1 and the current point at index P, as computed in block 916. D2 is the absolute value of the difference between the current point at index P and the subsequent point at index P+1, as computed in block 918. At block 920, if either D1 or D2 is within the difference range D, the point at index P is considered to be linear and is not changed, and control returns to FIG. 9, block 966. If both D1 and D2 are outside the difference range D, block 920 transfers to block 922. At block 922, if the absolute value of the difference between the point at index P and the median is outside the difference range D, block 922 transfers to block 924, where the point at index P is recomputed as the average between the previous and subsequent points P−1 and P+1,respectively, thereby linearizing the current point. Block 924 then returns to FIG. 9, block 966. If at block 922 the difference is within the difference range D, the point at index P is considered to be fairly linear and control returns to FIG. 9, block 966.

Occasionally, a row in the left or right edge set has no detectable edges, hence no valid edge points. This situation arises when the material being scanned is very similar to its background, or has very subtle changes in tonality along a particular row. These rows are marked with entries of −1 in both the left and right edge arrays. If the current point at index P is not a valid edge point, block 914 transfers to block 926, where the absolute value of the difference between the previous point at P−1 and the median is computed as D1. At block 928, the absolute value of the difference between the subsequent point at P+1 and the median is computed as D2. At block 930, if both D1 and D2 are within the difference range D, then at block 932, the current point at index P is recomputed as the average between the previous and subsequent points P−1 and P+1, respectively, and control returns to FIG. 9, block 966. If at block 930 the D1 and D2 are outside the difference range D, then block 930 transfers to block 934. If D1 is within the difference range D, then block 934 transfers to block 936, where the current point at index P gets the edge point value of the previous point at index P−1 and control returns to FIG. 9, block 966. If at block 934, D1 is outside the difference range D, then block 934 transfers to block 938. At block 938, if D2 is within the difference range D, then the current point at index P gets the edge point value of the subsequent point at index P+1 in block 940, and control returns to FIG. 9, block 966, otherwise block 938 returns to FIG. 9, block 966.

The next case to be handled in FIG. 9 is at block 942. If the previous and subsequent edge points at indices P−1 and P+1, respectively, are not valid points, then it is highly likely that the edge point at index P is unreliable, possibly scanner noise, lint, or a smudge on the copyboard glass. Thus at block 944, the edge at index P is made invalid, and block 966 continues processing the next point. Blocks 946 and 956 handle cases where two of the three consecutive edge points at P−1, P, and P+1 are valid, and one of the three is not. If the previous point at index P−1 is invalid and the points at indices P and P+1 are valid, the point at index P is linearized according to the point at index P+1 and the median, if necessary, and block 946 transfers to FIG. 9B, block 948. In block 948, the absolute value of the difference between the current point at index P and the subsequent point at index P+1 is computed as D1. In block 950, the absolute value of the difference between the current point at index P and the median is computed as D2. In block 952, if D1 is greater than or equal to the difference range D, and D2 is greater than D, the current point is recomputed in block 954 as the median plus half the difference between the median and the subsequent point at index P+1 and block 954 transfers to FIG. 9, block 966. If D1 is less than the difference range D or D2 is less than or equal to D, then control returns to FIG. 9, block 966.

If in block 946, the point at index P−1 is valid or the other two points at indices P and P+1 are not valid, block 946 transfers to block 956. In block 956, if the subsequent point at index P+1 is invalid and the points at indices P−1 and P are valid, the point at index P is linearized according to the point at index P−1 and the median, if necessary, and block 956 transfers to FIG. 9B, block 958. In block 958, the absolute value of the difference between the current point at index P and the previous point at index P−1 is computed as D1. In block 960, the absolute value of the difference between the current point at index P and the median is computed as D2. In block 962, if D1 is greater than or equal to the difference range D, and D2 is greater than D, the current point is recomputed in block 964 as the median plus half the difference between the median and the previous point at index P−1 and block 964 transfers to FIG. 9, block 966. If D1 is less than the difference range D or D2 is less than or equal to D, then control returns to FIG. 9, block 966. At block 966, if there are more points in the edge array, control transfers to block 904. If there are no more points, block 966 returns to the point of call in FIG. 8.

Figure 10:
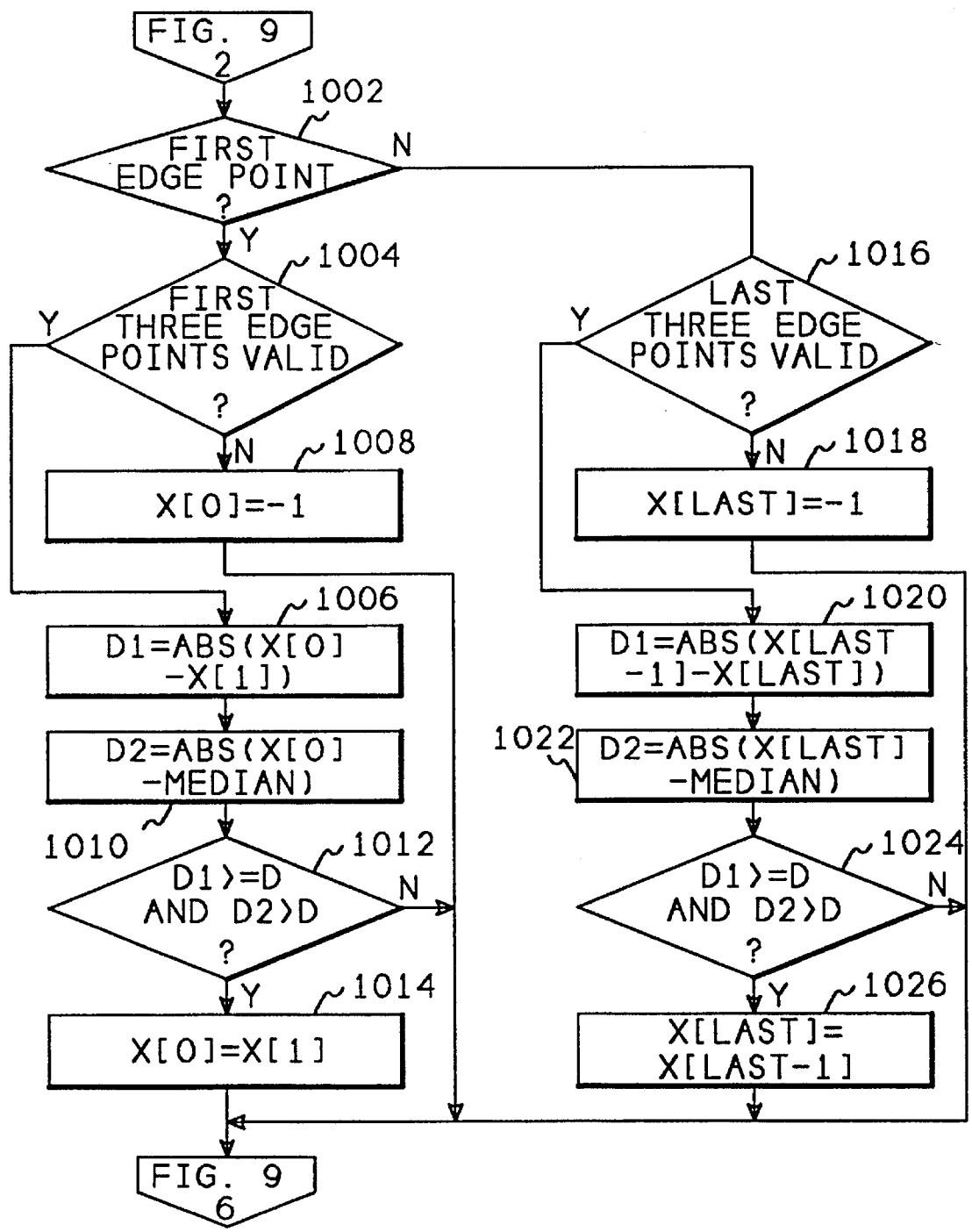

If the point being processed is the first or last point within the array, block 906 transfers to block 1002 of FIG. 10. Block 1002 determines if the first point or the last point is being processed. If the first point is being processed, block 1002 transfers to block 1004, which determines if the first three edge points are all valid points. If the first point is valid and the second point is invalid, then the first point is rendered invalid in block 1008, and control returns to FIG. 9, block 966. If the second and the third points are valid, then the absolute value of the difference between the first and the second point is computed as D1 in block 1006, and the absolute value of the difference between the first point and the median is computed as D2 in block 1010. In block 1012, if D1 is greater than or equal to the difference range D and D2 is greater than D, then block 1012 transfers to block 1014, where the first point gets the edge value of the second point, and control returns to FIG. 9, block 966. If neither D1 or D2 meet or exceed the difference range D, then control returns to FIG. 9, block 966. Processing for the last point is virtually identical to that for the first. If in block 1002, the last point indexed by LAST is being processed, block 1002 transfers to block 1016, where the last three edge points are evaluated. In block 1016, if the last edge point indexed by LAST is valid and the second to the last edge point indexed by LAST−1 is invalid, then the last point is rendered invalid in block 1018 and control returns to FIG. 9, block 966. If the second to last and the third to last points indexed by LAST−1 and LAST−2, respectively, are valid, then block 1016 transfers to block 1020, where the absolute value of the difference between the point indexed by LAST−1 and the point indexed by LAST is computed as D1. In block 1022, the absolute value of the difference between the point indexed by LAST and the median is computed as D2. In block 1024, if D1 is greater than or equal to the difference range D and D2 is greater than D, the last point indexed by LAST gets the value of the second to last point indexed by LAST−1 and control returns to FIG. 9, block 966. Otherwise, if neither D1 or D2 exceed the difference range D, block 1024 returns to FIG. 9.

Figure 11:
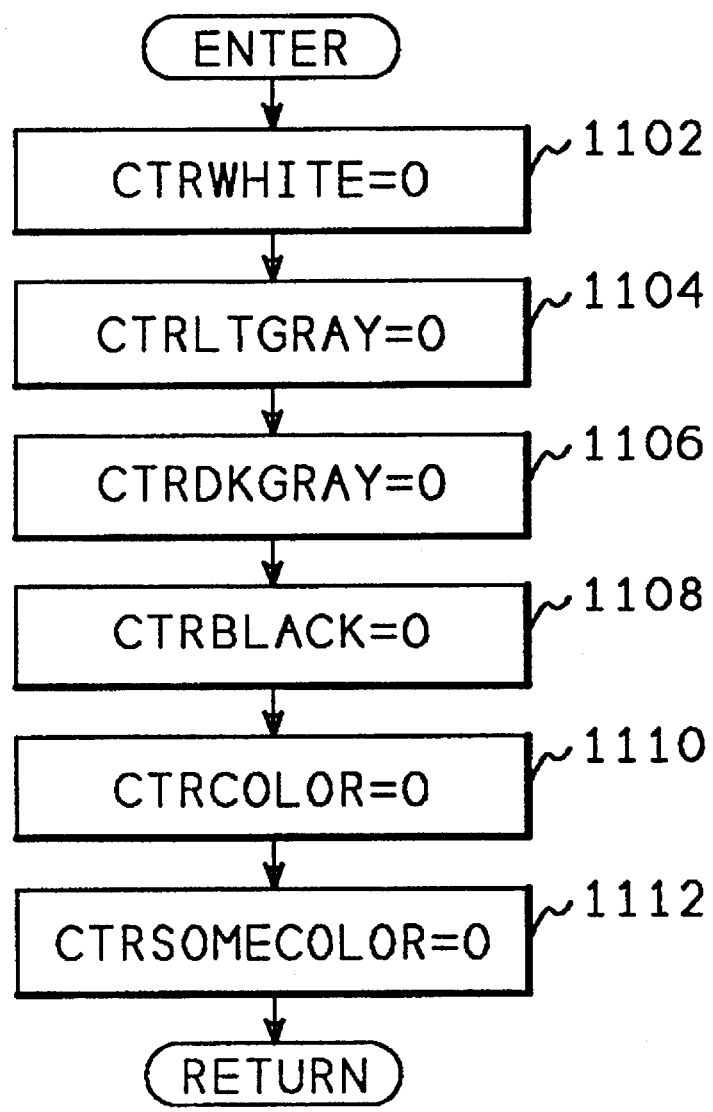
FIG. 11 shows a flowchart for initialization for determining the type of information.

FIG. 11 shows a flowchart of the initialization for determining the type of information contained within the boundary determined by FIGS. 4 through 10. Referring now to FIG. 11, after entry, a series of counters are all set to zero. These counters will be used to count the occurrence of pixels within the information area to determine the type of the information. Block 1102 sets a white counter to zero, block 1104 sets a light gray counter to zero, block 1106 sets a dark gray counter to zero, block 1108 sets a black counter to zero, block 1110 sets a color counter to zero, and block 1112 sets a some color counter to zero. FIG. 11 then returns to FIG. 3.

Figure 12:
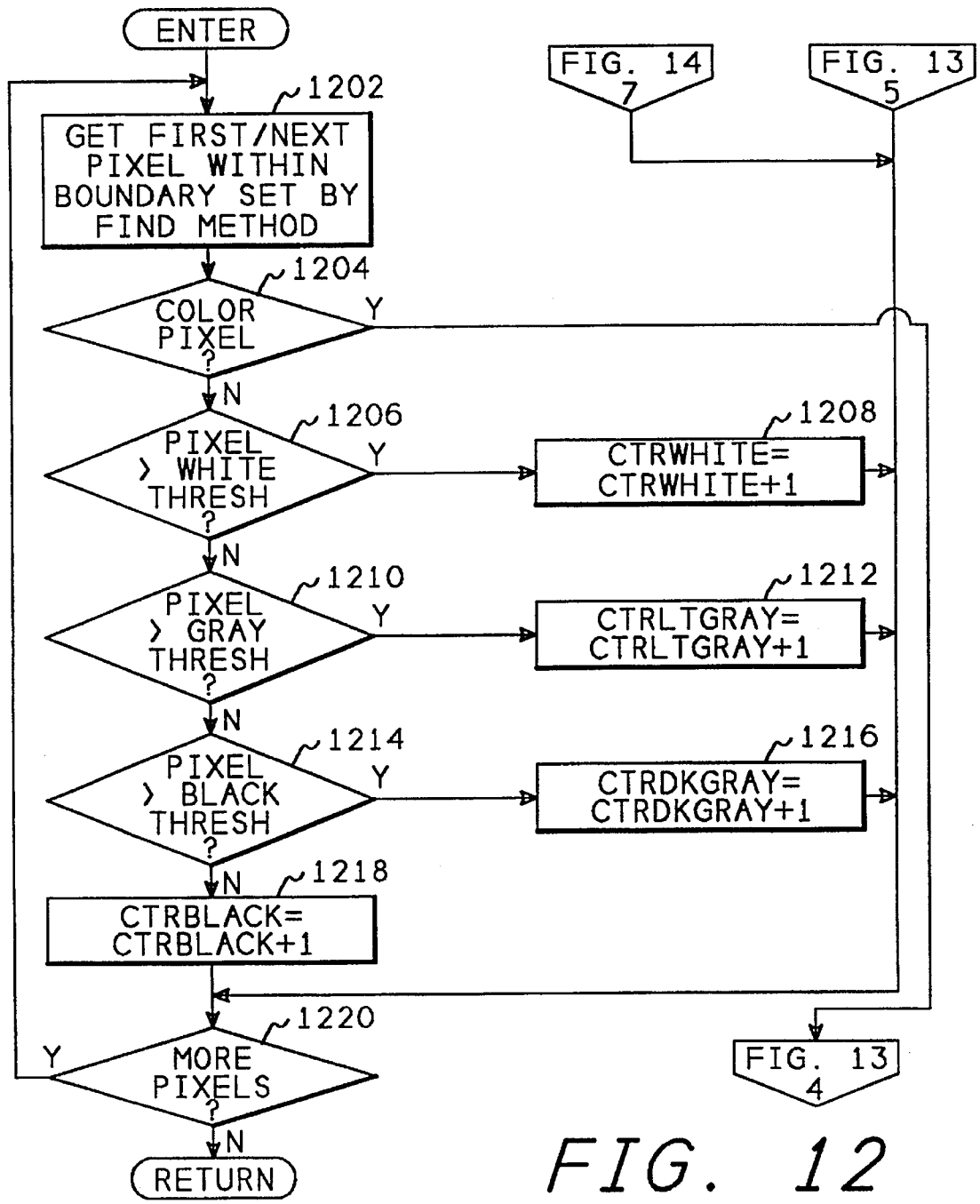
FIGS. 12–14 show a flowchart for analyzing the information within the bounding rectangle.
Figure 13:
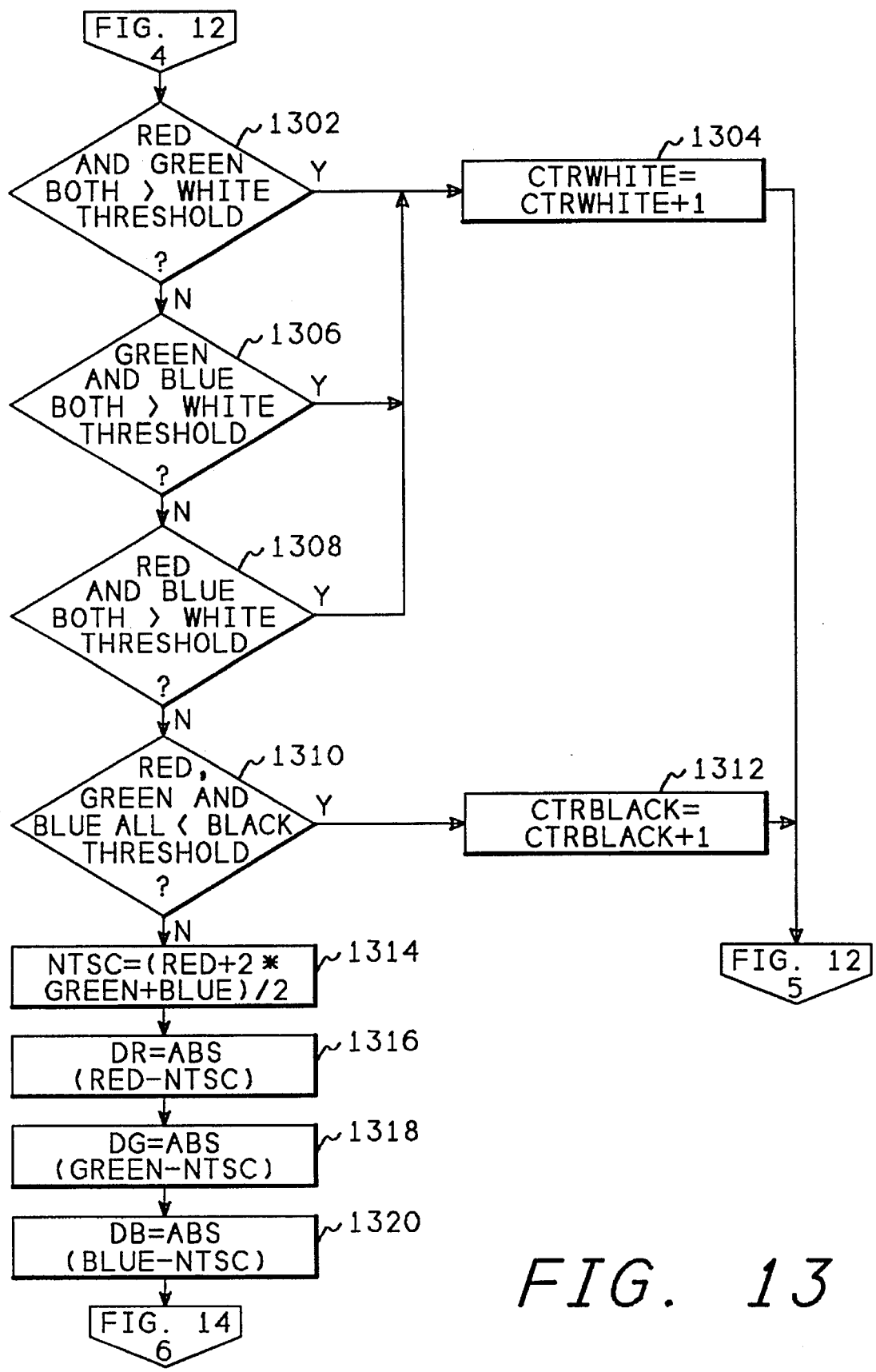
Figure 14:
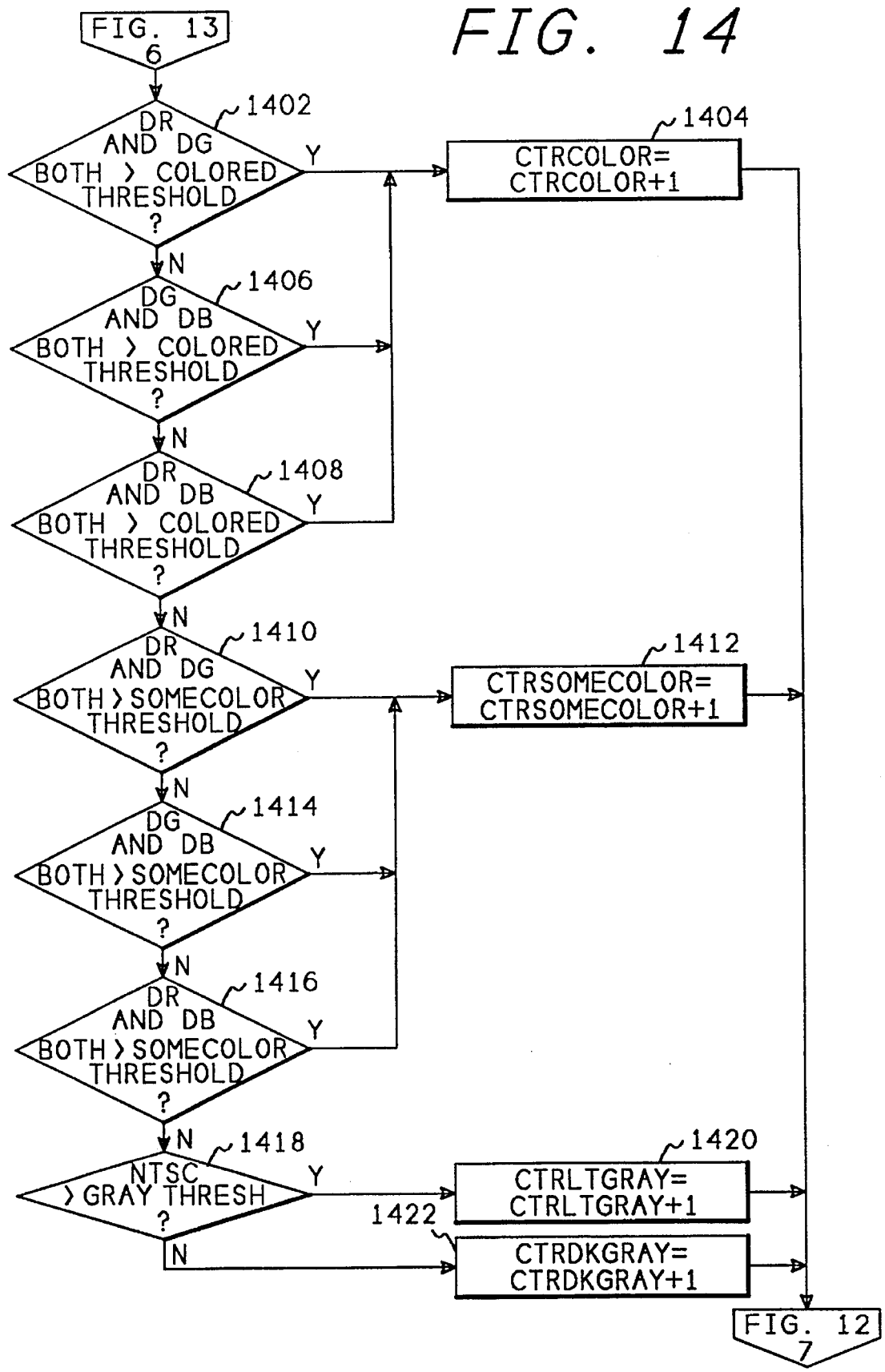

FIGS. 12 through 14 iterate through the imaging data within the boundary determined by FIGS. 4 through 10 to analyze each pixel. The analysis of gray scale data is done using four counters. On the basis of three thresholds, one for white, gray, and black pixels, the data is classified into one of four categories.

For color data, six counters are used. Five thresholds, one for white, gray, black, colored, and some color, are used to classify the data into one of six categories. Pixels whose red and green values are both greater than the white threshold, or red and blue values are both greater than the white threshold, or blue and green are both greater than the white threshold, are classified as white and increment the white counter. Failing this test, pixels whose red, green, and blue values are all less than the black threshold are classified as black and increment the black counter. Any remaining pixels are converted into a NTSC pixel weighted average value based on their red, green, and blue components. Three differences are then computed between each of the colors and the NTSC pixel value and these differences are then used to classify the pixel. If the red and green differences are both greater than the colored threshold, or the red and blue differences are both greater than the colored threshold, or the green and blue differences are both greater than the colored threshold, the pixel is classified as colored and the colored counter in incremented. If the data fails the colored test, it is tested to determine if it has some color. If the red and green differences are both greater than the some color threshold, or the red and blue differences are both greater than the some color threshold, or the green and blue differences are both greater than the some color threshold, the pixel is classified as some color and the some color counter is incremented. If a pixel has not yet been classified, the NTSC value calculated earlier is compared to the gray threshold and if the NTSC value is greater than the gray threshold, the pixel is classified as light gray, otherwise it is classified as dark gray.

Referring now to FIGS. 12 through 14, after entry, block 1202 gets the first or next pixel within the rectangle boundary set by FIGS. 4 through 10. Block 1204 then determines whether it is a color pixel and if it is not, transfers to block 1206 which determines whether the value for the pixel is greater than the white threshold defined in Table 1. Although the white, gray, black, color and some color thresholds in Table 1 are defined for a scale of 0 to 255, the invention is not so limited. The Thresholds can be similarly defined for any scale.

If the value for the pixel is greater than the white threshold, block 1206 goes to block 1208 which increments the white counter by one and then transfers to block 1220 which determines whether there are more pixels to process and if so, block 1220 transfers back to block 1202 to get the next pixel.

If the pixel value is not greater than the white threshold, block 1206 transfers to block 1210 which determines whether the pixel value is greater than the gray threshold of Table 1, and if it is, block 1210 transfers to block 1212 which increments the gray counter and then processes the next pixel. If the pixel value is not greater than the gray threshold, block 1210 goes to block 1214 which determines whether the pixel is greater than the black threshold of Table 1 and if it is, transfers to block 1216 which increments the dark gray counter. If the pixel value is not greater than the black threshold, block 1214 goes to block 1218 which increments the black counter by one and then processes the next pixel.

If the pixel is a color pixel, block 1204 transfers to block 1302 of FIG. 13. Block 1302 determines whether the red and green components are both greater than the white threshold of FIG. 1 and if both are, block 1302 transfers to block 1304 to increment the white counter by one. If the either the red or the green components are less than the white threshold, block 1302 goes to block 1306 which determines whether both the green and blue components are greater than the white threshold and if both are, block 1306 transfers to block 1304 to increment the white counter. If either the green or blue component is less than the white threshold, block 1306 goes to block 1308 which determines whether the red and blue components are both greater than the white threshold and if they are, block 1308 also transfers to block 1304 to increment the white counter.

If either the red or blue components are less than or equal to the white threshold, block 1308 transfers to block 1310 which determines whether the red, green, and blue components are all less than the black threshold of Table 1 and if all are, block 1310 transfers to block 1312 which increments the black counter by one. If either the red, green, or blue components are greater than or equal to the black threshold, block 1310 goes to block 1314 which computes the value of NTSC as the red component value, plus two times the green component value, plus the blue component value, all divided by four. Block 1316 then computes the value for DR as the absolute value of the red component minus NTSC, block 1318 computes DG as the absolute value of the green component minus NTSC, and block 1320 computes DB as the absolute value of the blue component minus NTSC.

Control then transfers to FIG. 14, block 1402. Block 1402 determines whether both the DR and DG values are greater than the color threshold of Table 1 and if so, transfers to block 1404 which increments the color counter by one before returning to FIG. 12. If either the DR or the DG is less than or equal to the color threshold, block 1402 goes to block 1406 which determines whether both the DG and DB values are greater than the color threshold and if both are, block 1406 also transfers to block 1404. If either the DG or DB values are less than or equal to the color threshold, block 1406 goes to block 1408 which determines whether both the DR and DB values are both greater than the color threshold and if so, block 1408 also transfers to block 1404 to increment the color counter. If either the DR or DB values are less than or equal to the color threshold, block 1408 goes to block 1410 which determines whether both the DR and DG values are greater than the some color threshold of Table 1 and if so, control goes to block 1412 which increments the some color counter by one before returning to FIG. 12. Blocks 1414 and 1416 perform similar values to block 1406 and 1408 but use the some color threshold. If none of these tests are satisfied, control goes to block 1418 which determines whether the NTSC value is greater than the gray threshold. If the NTSC value is greater than the gray threshold, block 1420 increments the light gray counter and if the NTSC value is less than or equal to the gray threshold, block 1422 increments the dark gray counter before returning to FIG. 12.

Figure 15:
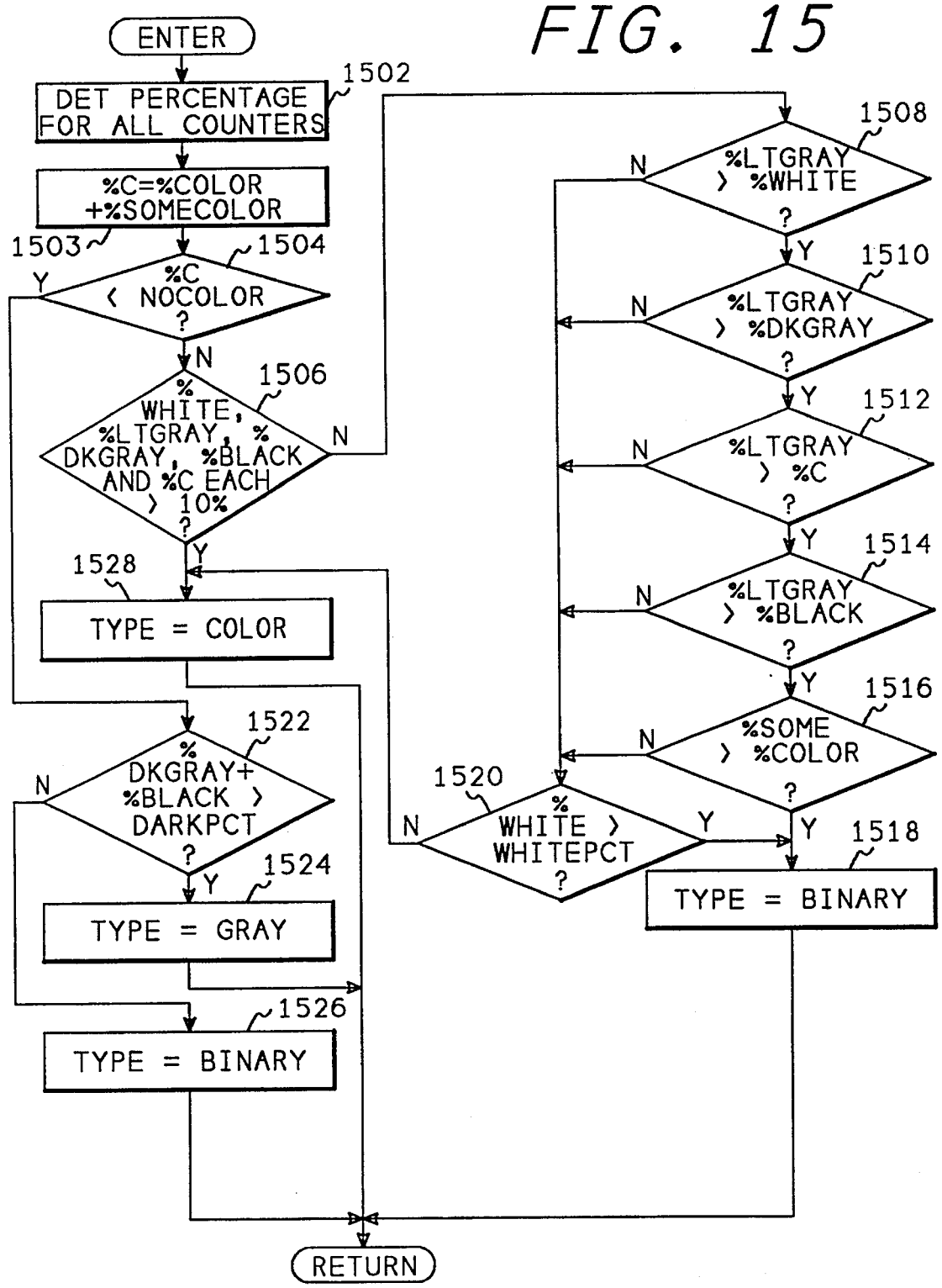
FIG. 15 shows a flowchart for determining the type of information contained within the bounding rectangle.

After the color or gray scale of the pixels have been analyzed, FIG. 12 returns to FIG. 3 which then calls FIG. 15 to determine the type of the data based on the analysis done in FIGS. 12 through 14. Referring now to FIG. 15, after entry, block 1502 determines the percentage of each counter compared to the whole number of pixels that have been analyzed. Block 1503 computes a variable % C as the percent of the color counter plus the percent of the some color counter. Block 1504 then determines whether % C is less than a No Color Percentage in Table 1. If % C is less than the No Color Percentage, this is an indication that there is little or no color information contained within the boundary determined by FIGS. 4 through 10, hence the image information is either binary or grayscale in nature. A high combined dark gray and black percentage indicates tone information typically found in black and white photographs. Block 1504 transfers in this case to block 1522 which determines whether the percentage of the dark gray counter plus the percentage of the black counter combined are greater than the Dark Percentage of Table 1. If this is true, control goes to block 1524 which sets the data type as gray and then returns to FIG. 3. If this is not true, block 1522 transfers to block 1526 which sets the data type to binary before returning to FIG. 3.

If the % C is greater than or equal to the no color value, block 1504 transfers to block 1506. This is an indication that there is color information contained within the boundary determined by FIGS. 4 through 10, hence the image information is either binary (in the case of colored paper) or color in nature. Binary image information contains a high percentage of light gray, with little dark gray or black save the ink on a page. Block 1506 determines whether the percentage of the white counter, and the percentage of the light gray counter, and the percentage of the dark gray counter, and the percentage of the black counter, and the value of % C are each greater than 10% and if so, block 1506 transfers to block 1528 which sets the type of information to color before returning to FIG. 3. If any is less than or equal to 10%, block 1506 transfers to block 1508 which determines whether the percentage of the light gray counter is greater than the percentage of the white counter. If so, control goes to block 1510 which checks the percentage of the light gray counter to be greater than the percentage of the dark gray counter. If so, block 1510 transfers to block 1512 which determines whether the percentage of the light gray counter is greater than % C and if this is true, transfers to block 1514. Block 1514 checks the percentage of the light gray counter against the percentage of the black counter and if the light gray counter is greater, transfers to block 1516 which checks the percentage of the some color counter against the percentage of the color counter and if the some color counter is greater, transfers to block 1518 to set the image type to binary before returning to FIG. 3. If any of the tests of blocks 1508, 1510, 1512, 1514, or 1516 fail, control goes to block 1520 which determines whether the percentage of the white counter is greater than the white percent value from Table 1 and if so, control goes to block 1518 to set the data type to binary. If not, block 1520 transfers to block 1528 which sets the type to color before returning to FIG. 3.

Images that are determined to be binary are classified as black and white drawing. Those that contain little or no color component and are not considered to be binary are classified as grayscale, also called black and white photo. Those that contain some color component and are not considered to be primarily binary or grayscale are classified as color, also called color photo.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| Parameter | Value |
| --- | --- |
| Edge Threshold | 25 |
| Minimum Line Size | 10 |
| Max Line Check | 4 |
| Max Diff | 8 |
| White Threshold | 204 |
| Gray Threshold | 150 |
| Black Threshold | 64 |
| Colored Threshold | 30 |
| Some Color Threshold | 21 |
| No Color Percentage | 3 |
| White Percentage | 70 |
| Light Percentage | 50 |
| Dark Percentage | 50 |
| Color Percentage | 25 |

What is claimed is:

1. A method for locating graphical information within a scanned image and drawing a bounding rectangle around said information, said method comprising the steps of:

(a) scanning said image into a computer system;

(b) locating left and right edges of information within each row of said image;

(c) locating a top row of said information as a first row of said image having a predetermined number of pixels between left and right edges and defining said top row as a top boundary of said rectangle;

(d) locating a bottom row of said information as a last row of said image having said predetermined number of pixels between left and right edges and defining said bottom row as a bottom boundary of said rectangle;

(e) fitting a first straight line to said left edges and fitting a second straight line to said right edges;

(f) locating a leftmost point of said first straight line and placing a left boundary line of said rectangle at said leftmost point; and (g) locating a rightmost point of said second straight line and placing a right boundary line of said rectangle at said rightmost point.

2. The method of claim 1 further comprising the steps of:

(h) displaying said image on a graphical output device; and (i) displaying said bounding rectangle over said image.

3. The method of claim 1 wherein step (b) further comprises the steps of:

(b1) determining an average value of each pixel within each of said rows;

(b2) comparing said average value for each pixel with an average value for a previous pixel; and (b3) locating said edge at said previous pixel location if said average value for said pixel differs from said average value for said previous pixel by a predetermined edge threshold value.

4. The method of claim 3 wherein step (b1) further comprises the steps of:

(b1a) if said pixel value is a combination of colors, determining said average value by calculating said average as five times an absolute value of a difference between a red component of said pixel and a red component of a previous pixel plus five times an absolute value of a difference between said red component of said pixel and a red component of a subsequent pixel, adding to said average eight times an absolute value of a difference between a green component of said pixel and a green component of a previous pixel plus eight times an absolute value of a difference between said green component of said pixel and a green component of a subsequent pixel, adding to said average three times an absolute value of a difference between a blue component of said pixel and a blue component of a previous pixel plus three times an absolute value of a difference between said blue component of said pixel and a blue component of a subsequent pixel, and dividing said average by sixteen; and (b1b) if said pixel value is not a combination of colors, determining said average value by calculating said average as three times an absolute value of a difference between said pixel and said previous pixel plus three times an absolute value of a difference between said pixel and said subsequent pixel, adding to said average one and one-half times an absolute value of a difference between said pixel and a next previous pixel plus one and one-half times an absolute value of a difference between said pixel and a next subsequent pixel, and dividing said average by eight.

5. The method of claim 1 wherein step (e) further comprises the steps of:

(e1) determining a mean and a standard deviation of differences between each pair of edge locations in said left and right edges;

(e2) determining a median of edge locations in said left and right edges;

(e3) determining a difference range from said mean and said standard deviation;

(e4) processing each edge location in said left and right edges comprising the steps of (e4a) selecting an edge location (e4b) if a difference between said selected edge location and a previous row edge location exceeds said difference range continuing with step (e4c);

(e4b) if a difference between said selected edge location and a subsequent row edge location does not exceed said difference range, continuing with step (e4a);

(e4c) if a difference between said selected edge location and said median does not exceed said difference range, continuing with step (e4a);

(e4d) if said previous edge location and said subsequent row edge location are both valid edge locations, determining a new value for said edge location as an average of said previous row edge location and said subsequent row edge location and then continuing with step (e4a);

(e4e) if said previous edge location is invalid, determining a new value for said edge location as an average of said subsequent row edge location and said median and then continuing with step (e4a); and (e4f) if said subsequent edge location is invalid, determining a new value for said edge location as an average of said previous row edge location and said median and then continuing with step (e4a).

6. The method of claim 5 wherein step (e3) comprises determining said difference range as said mean plus one-half said standard deviation.

7. The method of claim 1 further comprising the steps of:

(h) placing each pixel within said boundary into one of a predetermined number of categories determined by the color and shade of said pixel; and (i) assigning a type to said information, wherein said type is determined by a percentage of pixels in each of said predetermined number of categories.

8. The method of claim 7 wherein step (h) further comprises the steps of:

(h1) establishing said predetermined number of categories as six;

(h2) if said pixel contains color components, placing said pixel comprising the steps of (h2a) if values of any two of said color components both exceed a predetermined white threshold, placing said pixel into a white category, (h2b) if values of said color components each fail to exceed a predetermine black threshold, placing said pixel into a black category, (h2c) defining a weighted average of said color components of said pixel, (h2d) if differences between values of any two color components and said weighted average exceed a predetermined color threshold, placing said pixel into a colored category, (h2e) if differences between values of any two color components and said weighted average exceed a predetermined some-color threshold, placing said pixel into a some-colored category, (h2f) if said weighted average exceeds a predetermined gray threshold, placing said pixel into a light gray category, otherwise placing said pixel into a dark gray category; and (h3) if said pixel does not contain color components, placing said pixel comprising the steps of (h3a) if a value of said pixel exceeds said predetermined white threshold, placing said pixel into a white category, (h3b) if a value of said pixel exceeds a predetermined gray threshold, placing said pixel into a light gray category, (h3c) if a value of said pixel exceeds said predetermined black threshold, placing said pixel into a dark gray category, and (h3d) if a value of said pixel does not exceed said predetermined black threshold, placing said pixel into a black category.

9. The method of claim 1 wherein steps (c) and (d) further comprise the steps of:

(c1) locating said top row as a first row of a predetermined number of consecutive rows having said predetermined number of pixels between left and right edges; and (d1) locating said bottom row as a last row of a predetermined number of consecutive rows having said predetermined number of pixels between left and right edges.

10. A method for determining a type of graphical information within a scanned image, said method comprising the steps of:

(a) scanning said image into a computer system;

(b) placing each pixel within said scanned image into one of a predetermined number of categories determined by the color and shade of said pixel, said placing comprising (b1) establishing said predetermined number of categories as six;

(b2) if said pixel contains color components, placing said pixel comprising the steps of (b2a) if values of any two of said color components both exceed a predetermined white threshold, placing said pixel into a white category, (b2b) if values of said color components each fail to exceed a predetermine black threshold, placing said pixel into a black category, (b2c) defining a weighted average of said color components of said pixel, (b2d) if differences between values of any two color components and said weighted average exceed a predetermined color threshold, placing said pixel into a colored category, (b2e) if differences between values of any two color components and said weighted average exceed a predetermined some-color threshold, placing said pixel into a some-colored category, (b2f) if said weighted average exceeds a predetermined gray threshold, placing said pixel into a light gray category, otherwise placing said pixel, into a dark gray category, and (b3) if said pixel does not contain color components, placing said pixel comprising the steps of (b3a) if a value of said pixel exceeds said predetermined white threshold, placing said pixel into a white category, (b3b) if a value of said pixel exceeds a predetermined gray threshold, placing said pixel into a light gray category, (b3c) if a value of said pixel exceeds said predetermined black threshold placing said pixel into a dark gray category, and (b3d) if a value of said pixel does not exceed said predetermined black threshold, placing said pixel into a black category; and assigning a type to said information, wherein said type is determined by a percentage of pixels in each of said predetermined number of categories.

11. The method of claim 10 further comprising the steps of:

(d) displaying said image on a graphical output device; and (e) displaying said type of said image on said graphical output device.

12. A method for locating graphical information within a scanned image and drawing a bounding rectangle around said information, said method comprising the steps of:

(a) scanning said image into a computer system;

(b) locating left and right edges of information within each row of said image;

(c) locating a top row of said information as a first row of said image having a predetermined number of pixels between left and right edges and defining said top row as a top boundary of said rectangle;

(d) locating a bottom row of said information as a last row of said image having said predetermined number of pixels between left and right edges and defining said bottom row as a bottom boundary of said rectangle;

(e) fitting a first straight line to said left edges and fitting a second straight line to said right edges;

(f) locating a leftmost point of said first straight line and placing a left boundary line of said rectangle at said leftmost point;

(g) locating a rightmost point of said second straight line and placing a right boundary line of said rectangle at said rightmost point;

(h) placing each pixel within said rectangle into one of a predetermined number of categories determined by the color and shade of said pixel; and (i) assigning a type to said information, wherein said type is determined by a percentage of pixels in each of said predetermined number of categories.

13. The method of claim 12 further comprising the steps of:

(j) displaying said image on a graphical output device; and (k) displaying said bounding rectangle over said image.

14. The method of claim 12 wherein step (b) further comprises the steps of:

(b1) determining an average value of each pixel within each of said rows;

(b2) comparing said average value for each pixel with an average value for a previous pixel; and (b3) locating said edge at said previous pixel location if said average value for said pixel differs from said average value for said previous pixel by a predetermined edge threshold value.

15. The method of claim 14 wherein step (b1) further comprises the steps of:

(b1a) if said pixel value is a combination of colors, determining said average value by calculating said average as five times an absolute value of a difference between a red component of said pixel and a red component of a previous pixel plus five times an absolute value of a difference between said red component of said pixel and a red component of a subsequent pixel, adding to said average eight times an absolute value of a difference between a green component of said pixel and a green component of a previous pixel plus eight times an absolute value of a difference between said green component of said pixel and a green component of a subsequent pixel, adding to said average three times an absolute value of a difference between a blue component of said pixel and a blue component of a previous pixel plus three times an absolute value of a difference between said blue component of said pixel and a blue component of a subsequent pixel, and dividing said average by sixteen; and (b1b) if said pixel value is not a combination of colors, determining said average value by calculating said average as three times an absolute value of a difference between said pixel and said previous pixel plus three times an absolute value of a difference between said pixel and said subsequent pixel, adding to said average one and one-half times an absolute value of a difference between said pixel and a next previous pixel plus one and one-half times an absolute value of a difference between said pixel and a next subsequent pixel, and dividing said average by eight.

16. The method of claim 12 wherein step (e) further comprises the steps of:

(e1) determining a mean and a standard deviation of differences between each pair of edge locations in said left and right edges;

(e2) determining a median of edge locations in said left and right edges;

(e3) determining a difference range from said mean and said standard deviation;

(e4) processing each edge location in said left and right edges comprising the steps of (e4a) selecting an edge location (e4b) if a difference between said selected edge location and a previous row edge location exceeds said difference range, continuing with step (e4c);

(e4b) if a difference between said selected edge location and a subsequent row edge location does not exceed said difference range, continuing with step (e4a);

(e4c) if a difference between said selected edge location and said median does not exceed said difference range, continuing with step (e4a);

(e4d) if said previous edge location and said subsequent row edge location are both valid edge locations, determining a new value for said edge location as an average of said previous row edge location and said subsequent row edge location and then continuing with step (e4a);

(e4e) if said previous edge location is invalid, determining a new value for said edge location as an average of said subsequent row edge location and said median and then continuing with step (e4a); and (e4f) if said subsequent edge location is invalid, determining a new value for said edge location as an average of said previous row edge location and said median and then continuing with step (e4a).

17. The method of claim 16 wherein step (e3) comprises determining said difference range as said mean plus one-half said standard deviation.

18. The method of claim 12 wherein step (h) further comprises the steps of:

(h1) establishing said predetermined number of categories as six;

(h2) if said pixel contains color components, placing said pixel comprising the steps of (h2a) if values of any two of said color components both exceed a predetermined white threshold, placing said pixel into a white category, (h2b) if values of said color components each fail to exceed a predetermine black threshold, placing said pixel into a black category, (h2c) defining a weighted average of said color components of said pixel, (h2d) if differences between values of any two color components and said weighted average exceed a predetermined color threshold, placing said pixel into a colored category, (h2e) if differences between values of any two color components and said weighted average exceed a predetermined some-color threshold, placing said pixel into a some-colored category, (h2f) if said weighted average exceeds a predetermined gray threshold, placing said pixel into a light gray category, otherwise placing said pixel into a dark gray category; and (h3) if said pixel does not contain color components, placing said pixel comprising the steps of (h3a) if a value of said pixel exceeds said predetermined white threshold, placing said pixel into a white category, (h3b) if a value of said pixel exceeds a predetermined gray threshold, placing said pixel into a light gray category, (h3c) if a value of said pixel exceeds said predetermined black threshold, placing said pixel into a dark gray category, and (h3d) if a value of said pixel does not exceed said predetermined black threshold, placing said pixel into a black category.

19. The method of claim 12 wherein steps (c) and (d) further comprise the steps of:

(c1) locating said top row as a first row of a predetermined number of consecutive rows having said predetermined number of pixels between left and right edges; and (d1) locating said bottom row as a last row of a predetermined number of consecutive rows having said predetermined number of pixels between left and right edges.

* * * * *